(12) United States Patent
Brennan, Jr.

(10) Patent No.: US 9,221,599 B2
(45) Date of Patent: Dec. 29, 2015

(54) COLLAPSIBLE STACKABLE SHIPPING CONTAINER WITH REUSABLE SEALS

(71) Applicant: Sea Box Inc., East Riverton, NJ (US)

(72) Inventor: James F. Brennan, Jr., Moorestown, NJ (US)

(*) Notice: Subject to any disclaimer, the term of this patent is extended or adjusted under 35 U.S.C. 154(b) by 0 days.

(21) Appl. No.: 13/800,899

(22) Filed: Mar. 13, 2013

(65) Prior Publication Data

US 2014/0263379 A1  Sep. 18, 2014

(51) Int. Cl.

| | |
|---|---|
| *E04H 1/00* | (2006.01) |
| *B65D 90/08* | (2006.01) |
| *B65D 88/02* | (2006.01) |
| *B65D 90/00* | (2006.01) |
| *B65D 88/12* | (2006.01) |
| *B65D 88/52* | (2006.01) |
| *B65D 88/10* | (2006.01) |

(52) U.S. Cl.
CPC ............ *B65D 90/08* (2013.01); *B65D 88/022* (2013.01); *B65D 88/524* (2013.01); *B65D 90/0026* (2013.01); *B65D 88/10* (2013.01); *B65D 88/12* (2013.01); *B65D 88/528* (2013.01); *Y02W 30/807* (2015.05)

(58) Field of Classification Search
CPC ......... E04B 1/66; E06B 7/16; B65D 88/5244; B65D 88/12; B65D 88/10; B65D 88/528; B65D 90/08; B65D 88/022
USPC ............... 52/64, 79.5, 71; 220/7, 6, 1.5, 4.31, 220/666, 678, 681, 683, 4.29; 277/628, 277/650, 629
See application file for complete search history.

(56) References Cited

U.S. PATENT DOCUMENTS

| | | | |
|---|---|---|---|
| 1,686,222 A | | 10/1928 | Adler |
| 2,958,912 A | * | 11/1960 | Bower et al. .................. 49/478.1 |
| 3,061,134 A | | 10/1962 | Fesmire et al. |
| 3,111,728 A | * | 11/1963 | Alderfer ....................... 49/478.1 |
| 3,304,668 A | * | 2/1967 | Edmonds ........................... 52/67 |
| 4,166,343 A | | 9/1979 | O'Brian et al. |
| 4,177,907 A | * | 12/1979 | Funaioli et al. ................ 220/1.5 |
| 4,577,772 A | * | 3/1986 | Bigliardi ........................ 220/1.5 |
| 4,590,710 A | * | 5/1986 | Newland ...................... 49/478.1 |
| 4,779,514 A | | 10/1988 | Prigmore et al. |
| 5,107,639 A | | 4/1992 | Morin et al. |
| 5,257,830 A | | 11/1993 | Pflueger |
| 5,461,831 A | * | 10/1995 | Michal ............................... 52/1 |
| 5,493,818 A | | 2/1996 | Wilson |
| 5,501,353 A | | 3/1996 | Warren |
| 5,596,844 A | | 1/1997 | Kalinowski |
| 5,878,903 A | | 3/1999 | Ung |
| 5,890,612 A | | 4/1999 | Coppi |

(Continued)

OTHER PUBLICATIONS

International Patent Application No. PCT/US13/30819: Notification of Transmittal of International Preliminary Report on Patentability dated Apr. 30, 2015, 14 pages.

*Primary Examiner* — Chi Q Nguyen
(74) *Attorney, Agent, or Firm* — Condo Roccia Koptiw LLP

(57) ABSTRACT

A reusable gasket may be configured for use between first and second collapsible containers of a shelter. The gasket may have a body configured to seal at least a portion of a seam defined between the first and second collapsible containers. The gasket may include at least one magnet embedded in the body. A reusable plug configured to be disposed into a cavity defined by a collapsible container may have a body configured to be compressibly secured in the cavity. The body of the plug may be made of compressible foam.

12 Claims, 22 Drawing Sheets

(56) References Cited

U.S. PATENT DOCUMENTS

| | | | | |
|---|---|---|---|---|
| 5,927,025 A | * | 7/1999 | Brockman et al. | 52/173.2 |
| 5,983,570 A | | 11/1999 | Brown | |
| 6,032,815 A | | 3/2000 | Elstone | |
| 6,108,982 A | | 8/2000 | Davison | |
| 6,109,469 A | | 8/2000 | Clive-Smith | |
| 6,112,929 A | | 9/2000 | Ota | |
| 6,164,476 A | | 12/2000 | Rene et al. | |
| 6,182,849 B1 | | 2/2001 | Elstone, Sr. | |
| 6,299,009 B1 | | 10/2001 | Ryziuk et al. | |
| 6,363,586 B1 | * | 4/2002 | Neufingerl | 24/287 |
| 6,523,486 B1 | * | 2/2003 | Plitt et al. | 108/27 |
| 6,920,693 B2 | * | 7/2005 | Hankins et al. | 29/897.2 |
| 6,938,789 B1 | * | 9/2005 | Matias et al. | 220/6 |
| 6,968,653 B2 | | 11/2005 | Stapleton, Jr. et al. | |
| 7,296,704 B2 | | 11/2007 | Ferrini | |
| 7,546,666 B2 | | 6/2009 | Malchow | |
| 7,647,731 B2 | | 1/2010 | Muir | |
| 7,703,632 B2 | | 4/2010 | Kochanowski | |
| 7,823,337 B2 | | 11/2010 | Pope | |
| 7,841,136 B2 | | 11/2010 | Czyznikiewicz | |
| 7,870,970 B2 | * | 1/2011 | Fisk | 220/7 |
| 7,938,283 B2 | * | 5/2011 | Villers et al. | 220/1.5 |
| 8,267,269 B2 | * | 9/2012 | Gundersen | 220/7 |
| 8,640,395 B2 | * | 2/2014 | DiSabantonio, III | 52/79.5 |
| 2002/0116878 A1 | | 8/2002 | Ciotti | |
| 2006/0043090 A1 | | 3/2006 | Ferrini | |
| 2009/0008885 A1 | | 1/2009 | Kanagae et al. | |
| 2009/0090709 A1 | * | 4/2009 | Shalomoff | 220/6 |
| 2009/0217600 A1 | * | 9/2009 | De Azambuja | 52/79.5 |
| 2010/0011676 A1 | | 1/2010 | Barry | |
| 2011/0132907 A1 | | 6/2011 | Hajichristou et al. | |
| 2011/0180533 A1 | | 7/2011 | Hay et al. | |
| 2011/0280499 A1 | * | 11/2011 | Brundage | 383/11 |
| 2012/0134129 A1 | * | 5/2012 | Josefiak et al. | 361/807 |
| 2012/0267366 A1 | * | 10/2012 | Wang | 220/7 |
| 2013/0168391 A1 | * | 7/2013 | Hunter | 220/7 |
| 2014/0044378 A1 | * | 2/2014 | Loeschen et al. | 383/2 |

* cited by examiner

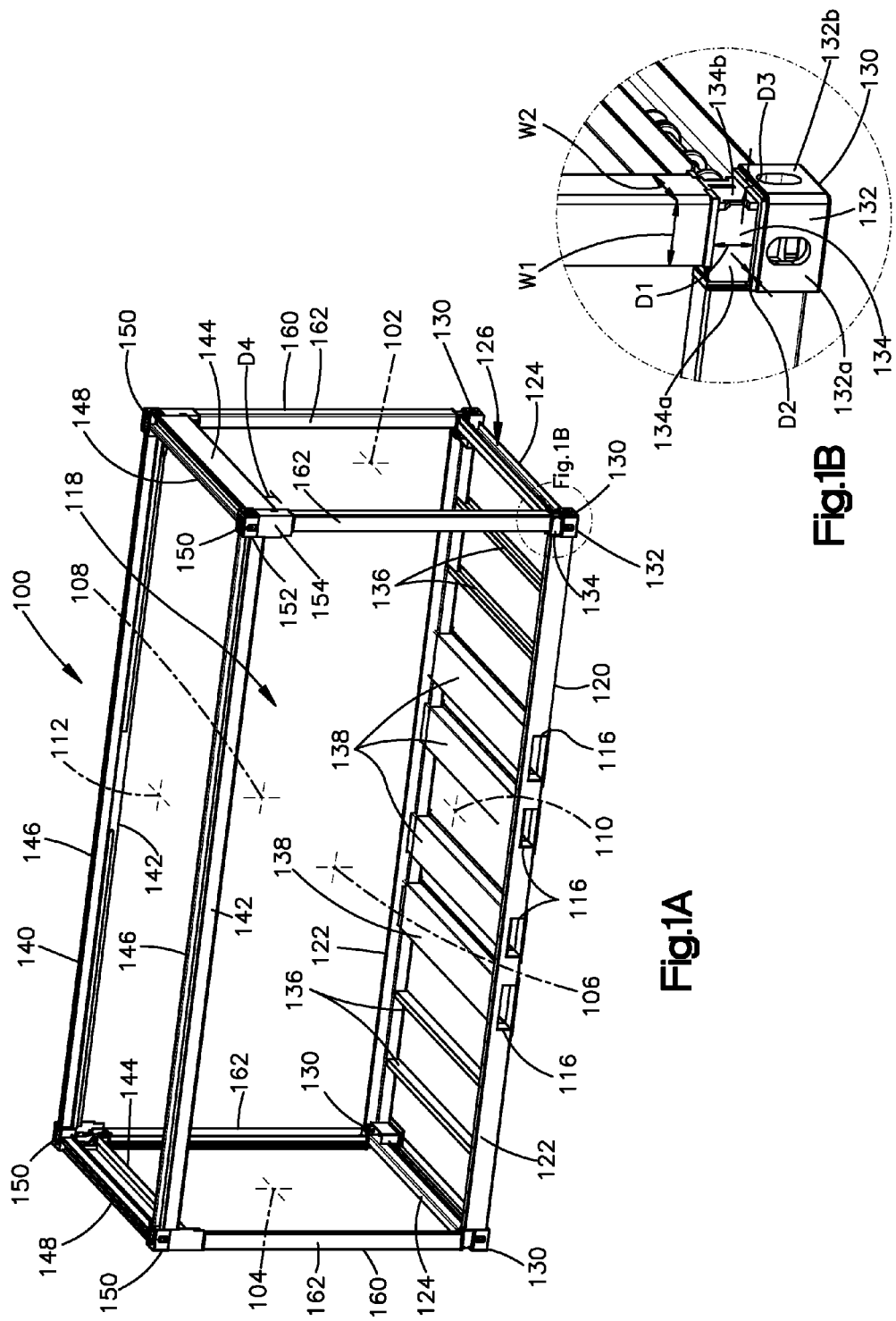

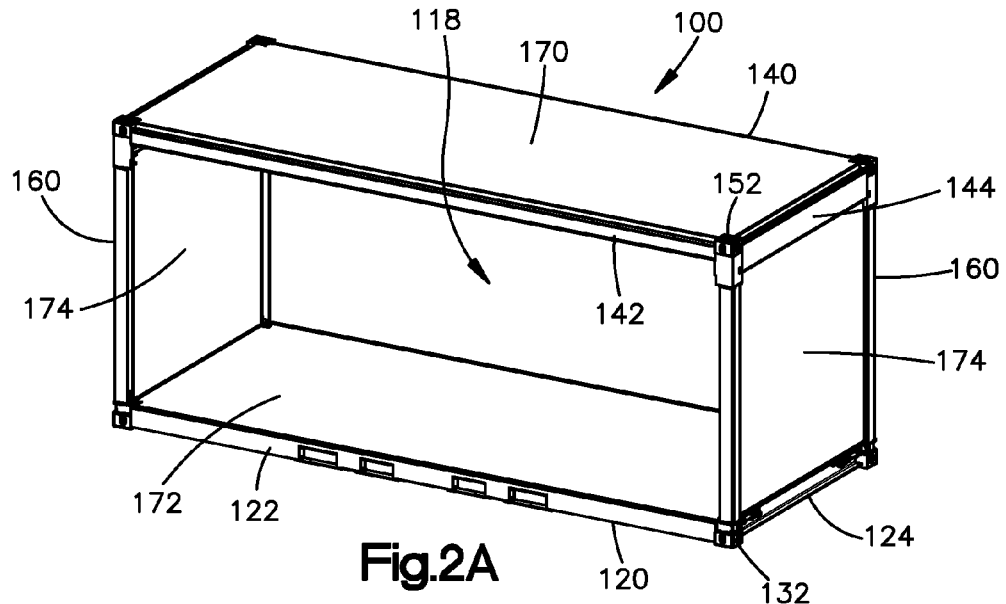
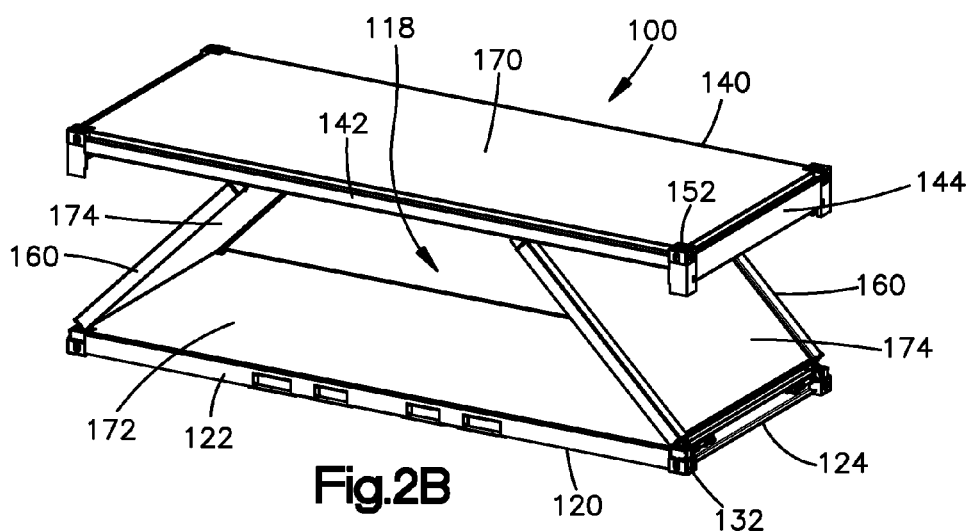
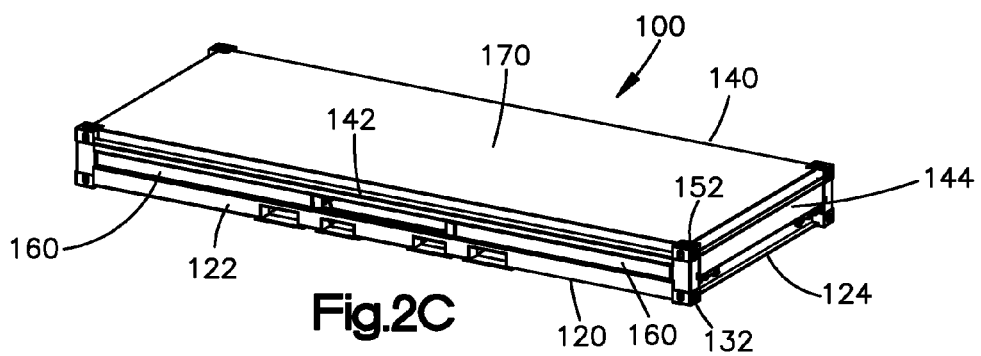

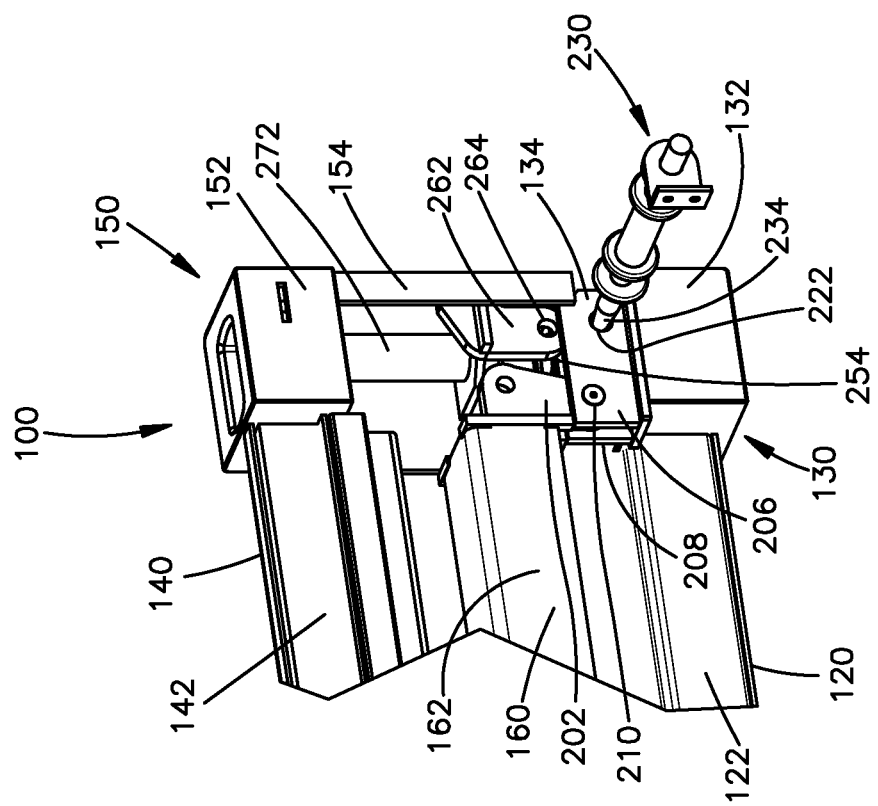
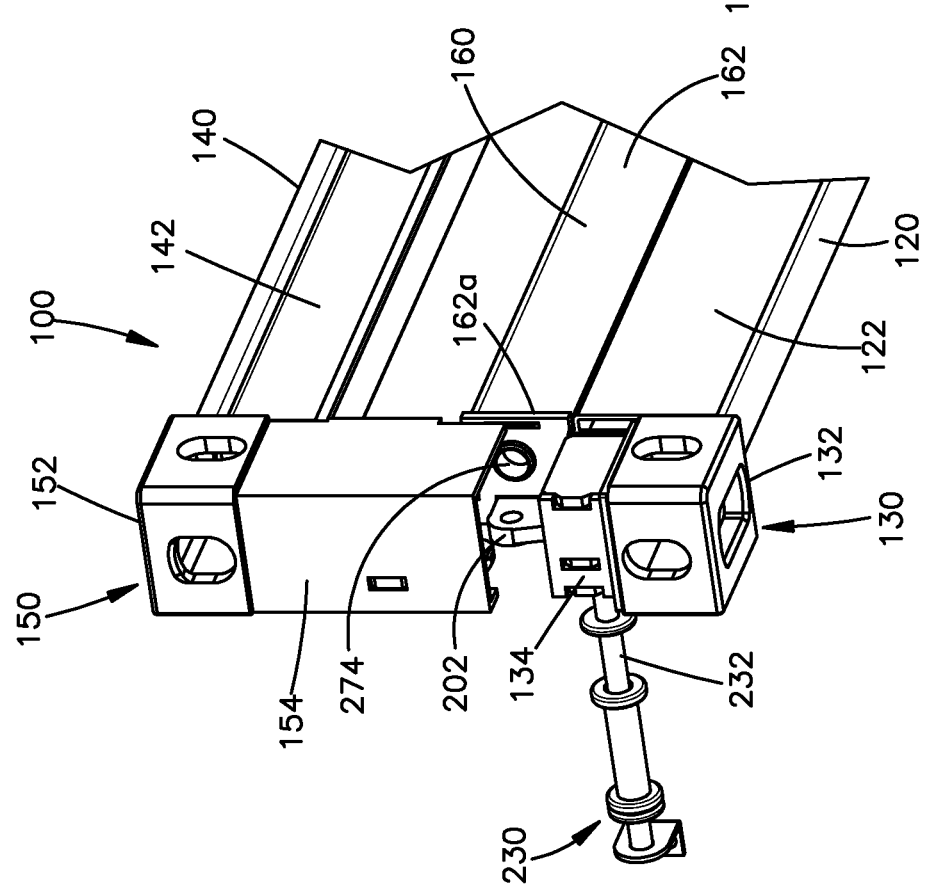
Fig.7F
Fig.7E

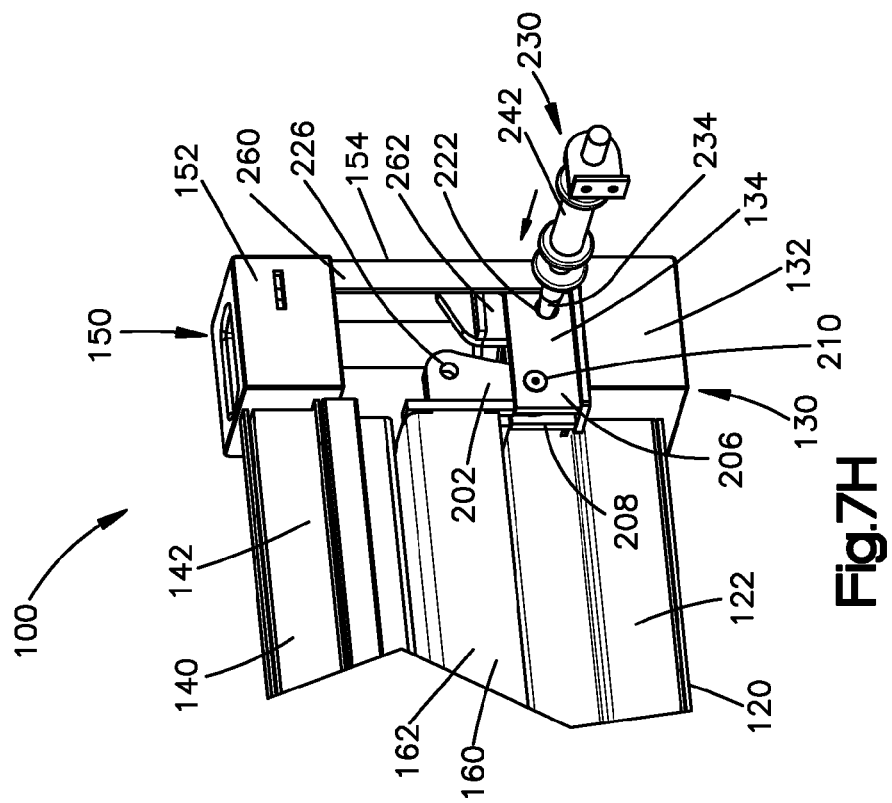
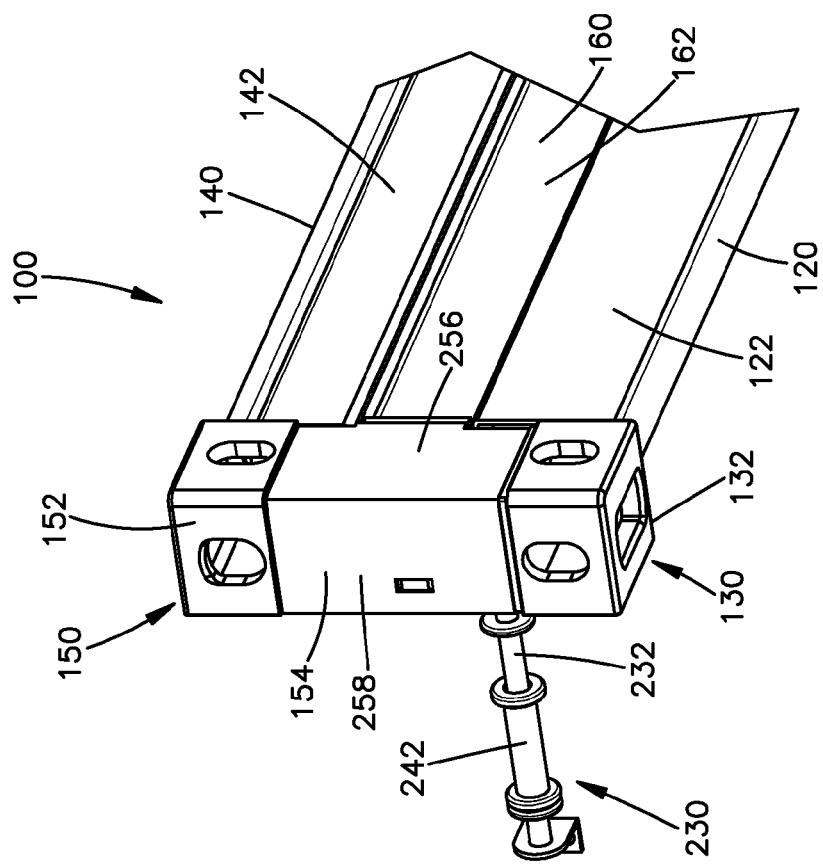

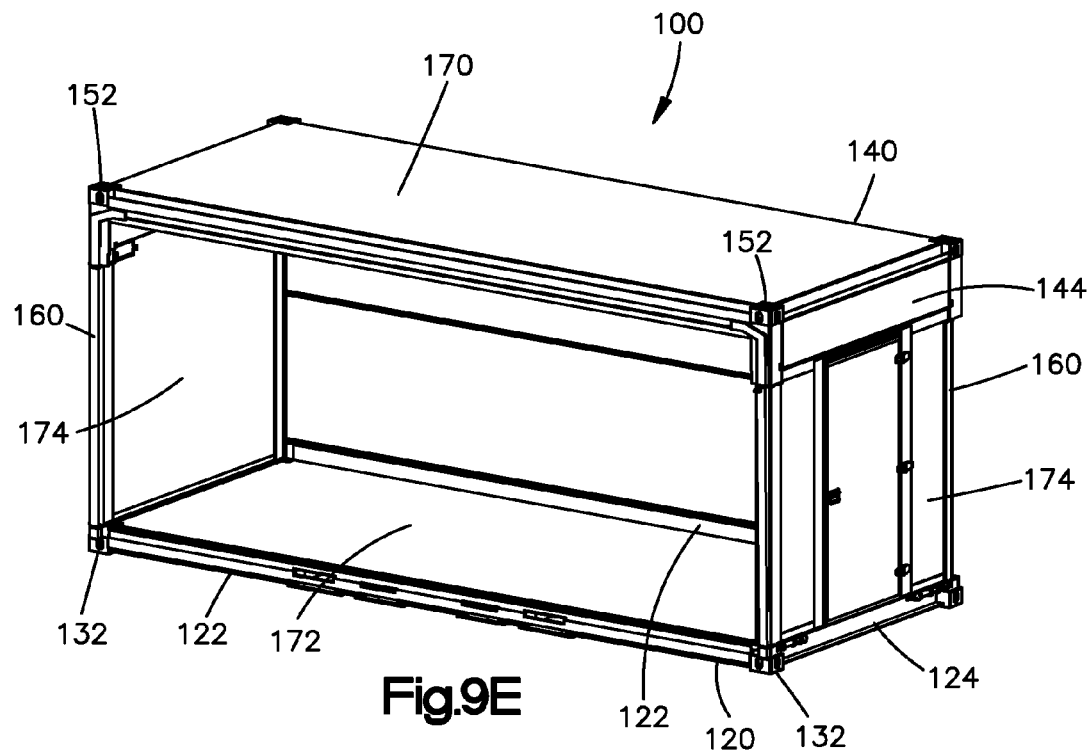
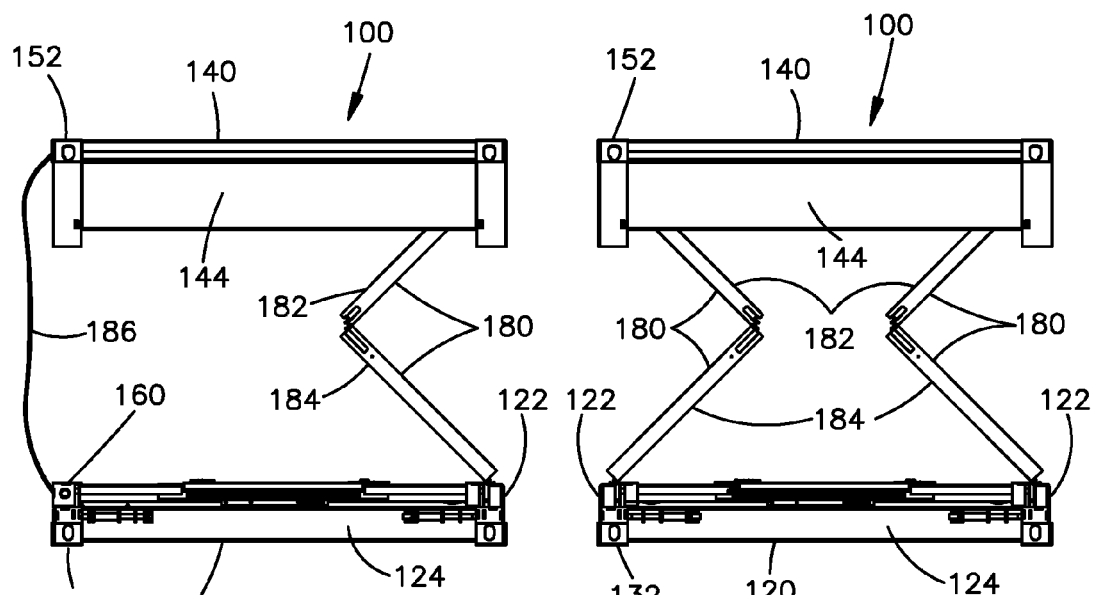

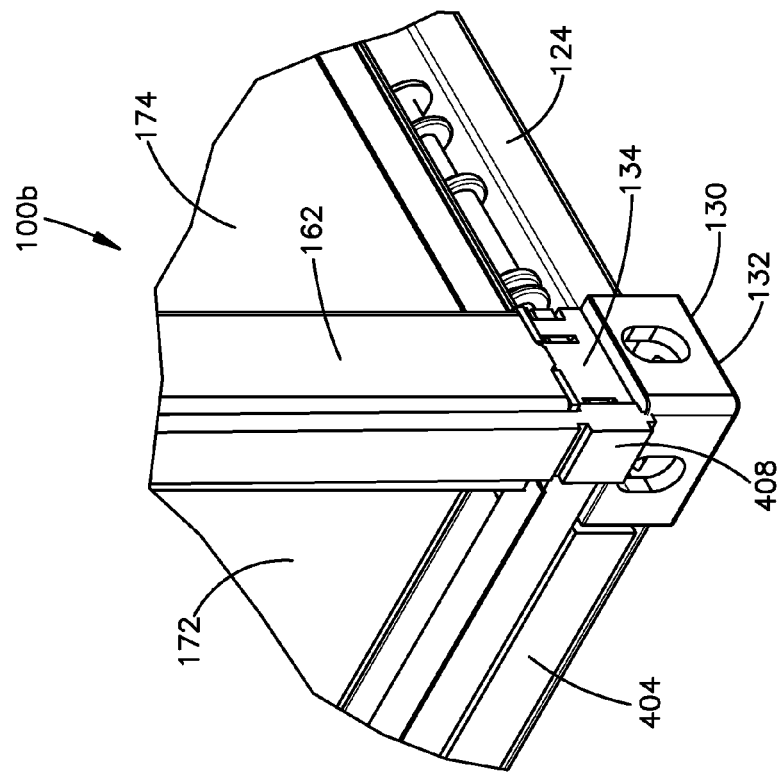
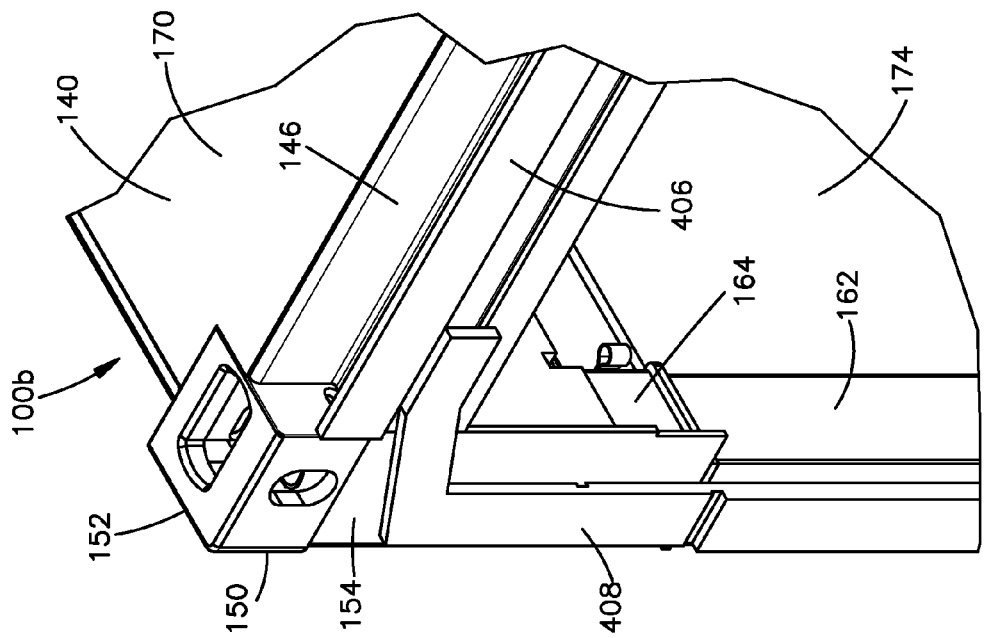

COLLAPSIBLE STACKABLE SHIPPING CONTAINER WITH REUSABLE SEALS

BACKGROUND

Collapsible containers, for instance collapsible shipping containers, may be configured for use as shelters. One or more such containers may be collapsed for transportation and/or shipment to a deployment site, for example via an ISO container ship. The collapsible containers may be erected at the deployment site to form one or more shelters. One or more of the erected containers may be interconnected to form the one or more shelters. If it is desirable to redeploy one or more of the shelters, for example to a new deployment site, respective ones of the containers may be collapsed for transportation and/or shipment to the new deployment site.

Known collapsible containers may have one or more shortcomings. For example, known collapsible containers typically have multiple components, such that erecting or collapsing the containers may be undesirably complex. Known collapsible containers may have components that are separable from the container, such as components that may be used to secure the container in the collapsed configuration but may not be used as part of an erected configuration of the container. Such components may be become lost (e.g., misplaced), and/or may be inadvertently disposed of during an interval between an initial time when the container was operated from the collapsed configuration to the erected configuration and a later time when it is desirable to operate the container back to the collapsed configuration. Erecting or collapsing known collapsible containers may be highly laborious, which may require inefficient expenditures of manpower and/or time.

When collapsible containers are configured to be connected to each other to create shelters, it may be desirable to seal interfaces where the containers connect to one another. Known components that may be used to seal such shelters assembled from collapsible containers (e.g., against water, sand, or the like) may have shortcomings. For example, seals used between collapsible containers in a shelter may not be reusable. Removal of used seals, for example when a shelter is broken down, may be undesirably labor and/or time intensive.

SUMMARY

A reusable gasket may be configured for use between first and second collapsible containers of a shelter. The gasket may have a body configured to seal at least a portion of a seam defined between the first and second collapsible containers. The gasket may include at least one magnet embedded in the body.

The body of the gasket may be made of ethylene propylene diene monomer (EPDM) rubber. The body of the gasket may include a plurality of magnets embedded in the body. The plurality of magnets may be spaced apart from each other within the body. At least one of the plurality of magnets may be a rare earth magnet.

The gasket may be configured to be disposed between corresponding end wall posts of the first and second collapsible containers. The gasket may be configured to be disposed between corresponding rails of the first and second collapsible containers. The rails may be at least one of roof rails or base rails.

A reusable plug configured to be disposed into a cavity defined by a collapsible container may have a body configured to be compressibly secured in the cavity. The body of the plug may be made of coated compressible foam.

The cavity may be defined between respective free ends of opposed collapsible end walls of the collapsible container. The cavity may be further defined between a base rail of the collapsible container and a roof rail of the collapsible container. The cavity may be further defined between a base rail of the collapsible container and a collapsible side wall of the collapsible container.

The cavity may be defined between a pair of end walls of the collapsible container and a roof rail of the collapsible container. The cavity may be defined between a pair of end walls of the collapsible container, respective posts of the pair of end walls, and a roof rail of the collapsible container.

The body of the plug may include a first portion configured to be attached to a portion of the roof of a collapsible container. The body of the plug may include a second portion configured to rotate about the first portion. The body of the plug may include a third portion configured to rotate about the second portion. The second portion of the body may be hinged with respect to the first portion. The third portion of the body may be hinged with respect to the second portion. The plug may include a plurality of hook and loop fasteners supported by the second portion.

BRIEF DESCRIPTION OF THE DRAWINGS

FIG. 1A is a perspective view of an example collapsible container 100 in an erected configuration, with no panels installed on the roof, the base, or the end walls.

FIG. 1B is a zoomed perspective view of a portion of the collapsible container illustrated in FIG. 1A.

FIG. 2A is a perspective view of the collapsible container illustrated in FIG. 1, the container including a roof panel, a floor panel, and a pair of end wall panels, with the container in the erected configuration.

FIG. 2B is a perspective view of the collapsible container illustrated in FIG. 2A, with the container in a partially collapsed configuration with the end walls rotating inward and the roof lowering.

FIG. 2C is a perspective view of the collapsible container illustrated in FIG. 2A, with the container in the collapsed configuration.

FIGS. 7A-7H are perspective views of portions of the collapsible container illustrated in FIG. 1, the views illustrating an example procedure for operating the container from the erected configuration to the collapsed configuration.

FIG. 9E is a perspective view of the collapsible container of FIG. 9A, with the container in the erected configuration.

FIG. 9F is an end elevation view of the collapsible container of FIG. 9A, with the container in a partially erected configuration.

FIG. 10 is an end elevation view of the collapsible container of FIG. 1, the container including two collapsible side walls, with the container in a partially erected configuration.

FIGS. 12C and 12D are perspective views of gaskets that may be used to create a seal between the containers of the shelter illustrated in FIG. 12A.

DETAILED DESCRIPTION

Figure 3A:
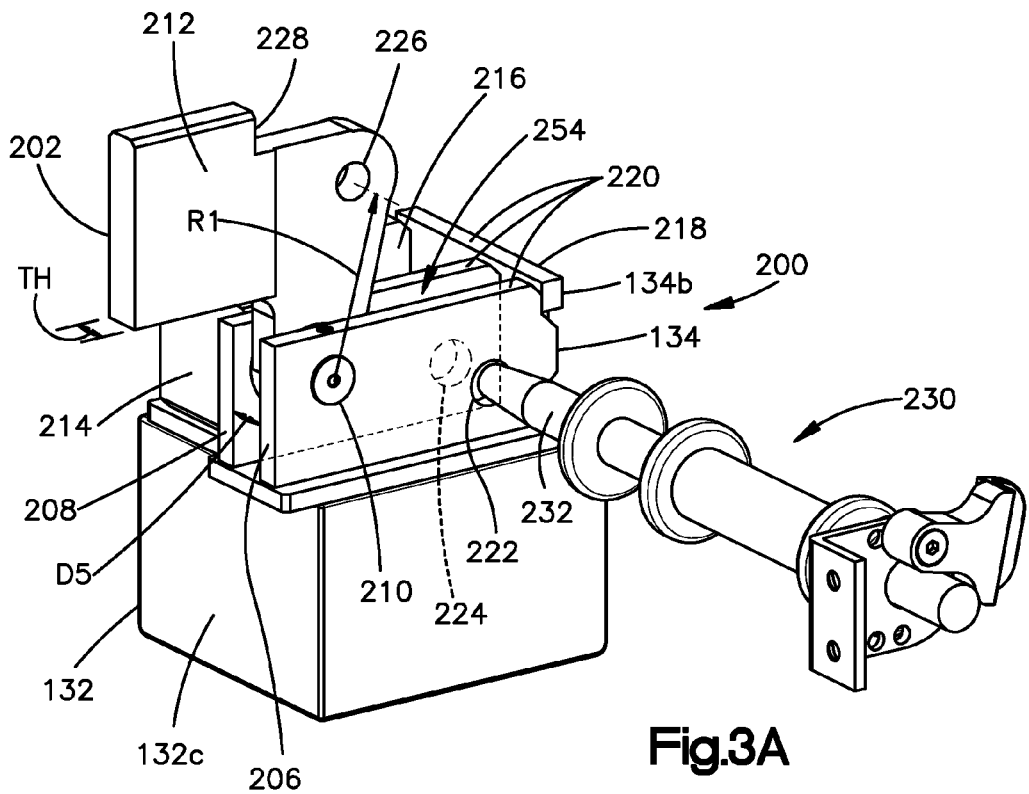
FIGS. 3A and 3B are perspective views of a hinge assembly that may be used to secure the end walls of the collapsible container illustrated in FIG. 1 in respective upright orientations.

FIG. 1 depicts an example collapsible container 100. The container 100 is illustrated in an erected configuration. The container 100 may be operated from the erected configuration to a collapsed configuration, for example as illustrated in FIGS. 2A-2C and described herein. The container 100 may define a first end 102, an opposed second end 104 that is spaced from the first end 102, opposed first and second sides 106, 108, that are spaced apart from each other, a lower end 110, and an opposed upper end 112 that is spaced from the lower end 110. The first and second ends 102, 104, the first and second sides 106, 108, the lower end 110, and the upper end 112 may define the bounds of an interior 118 of the container 100. The interior 118 of the container 100 may define a first volume when the container 100 is in the erected configuration and a second volume that is smaller than the first volume when the container 100 is in the collapsed configuration.

The container 100 may be configured such that the exterior dimensions of the container 100 are substantially equivalent to those of a standardized shipping container, for instance as specified by the International Organization for Standardization (ISO). The container 100 may be configured such that the exterior dimensions of the container 100 adhere to applicable ISO standards both when the container 100 is in the collapsed configuration and when the container 100 is in the erected configuration.

The container 100 may include a base 120 disposed substantially at the lower end 110, a roof 140 disposed substantially at the upper end 112, and a pair of end walls 160 that may be disposed substantially at the first and second ends 102, 104, respectively. The end walls 160 may extend substantially from the base 120 to the roof 140 when the container 100 is in the erected configuration. The end walls 160 may be configured as collapsible end walls. For example, the end walls 160 may be configured to rotate into the interior of the container 100 when the container 100 is in the collapsed configuration.

The base 120 may include a pair of base rails 122 that extend from the first end 102 to the second end 104. The base rails 122 may be spaced apart from each other. The base rails 122 may extend along the first and second sides 106, 108, respectively. The base 120 may include a pair of sills 124 that extend from the first side 106 to the second side 108. The sills 124 may be spaced apart from each other, and may extend along the first and second ends 102, 104, respectively. Each sill 124 may define at least one outward facing recess 126. The sills 124 may be configured to support one or more components of the container 100 in the recesses 126, for example as described herein.

The base 120 may include a plurality of corner assemblies 130. Each corner assembly 130 may be disposed at a respective corner of the base 120 and may be attached (e.g., welded) to corresponding ends of one of the base rails 122 and one of the sills 124, respectively. Each corner assembly 130 may include a corner casting 132 (e.g., an ISO corner casting) and a stub 134. The stub 134 of each corner assembly 130 may protrude upward (e.g., toward the upper end 112) from the corner casting 132, through a distance D1. The stub 134 of each corner assembly 130 may be attached its corner casting 132, for example to one or more upward facing surfaces of the corner casting 132. The stub 134 of each corner assembly 130 may be attached (e.g., welded) to the corner casting 132. The corner assembly 130 (e.g., the corner casting 132 and the stub 134) may be monolithic.

One or more of the stubs 134, for example each stub 134, may be configured to be at least partially received in a respective structure supported by the roof 140, such as a corresponding corner assembly 150 as described herein. For example, the corner casting 132 of each corner assembly 130 may define an outer side surface 132a and an outer end surface 132b. The corresponding stub 134 of each corner assembly may define an outer side surface 134a that is inwardly recessed relative to the outer side surface 132a and an outer end surface 134b that is inwardly recessed relative to the outer end surface 132b. For example, the outer side surface 134a may be spaced from the outer side surface 132a distance D2 and the outer end surface 134b may be spaced from the outer end surface 132b a distance D3 that may be the same or different from the distance D2.

The base 120 may include one or more cross members 136, or may include no cross members 136. As shown, the base 120 includes a plurality of cross members 136. The cross members 136 extend between, and structurally interconnect, the base rails 122. The base 120 may include one or more fork pockets 138, or may include no fork pockets 138. As shown, the base 120 includes a plurality of fork pockets 138. The plurality of fork pockets 138 may be configured to receive the forks of a container transporting apparatus, such as a fork lift. One or both of the base rails 122 may define a plurality of openings 116 that may extend therethrough. Each opening 116 may correspond to a respective one of the plurality of fork pockets 138.

The roof 140 may include a pair of roof rails 142. The roof rails 142 may extend substantially from the first end 102 to the second end 104. The roof rails 142 may be spaced apart from each other, and may extend along the first and second sides 106, 108, respectively. The roof 140 may include a pair of headers 144 that extend from the first side 106 to the second side 108. The headers 144 may be spaced apart from each other, and may extend along the first and second ends 102, 104, respectively.

Figure 4A:
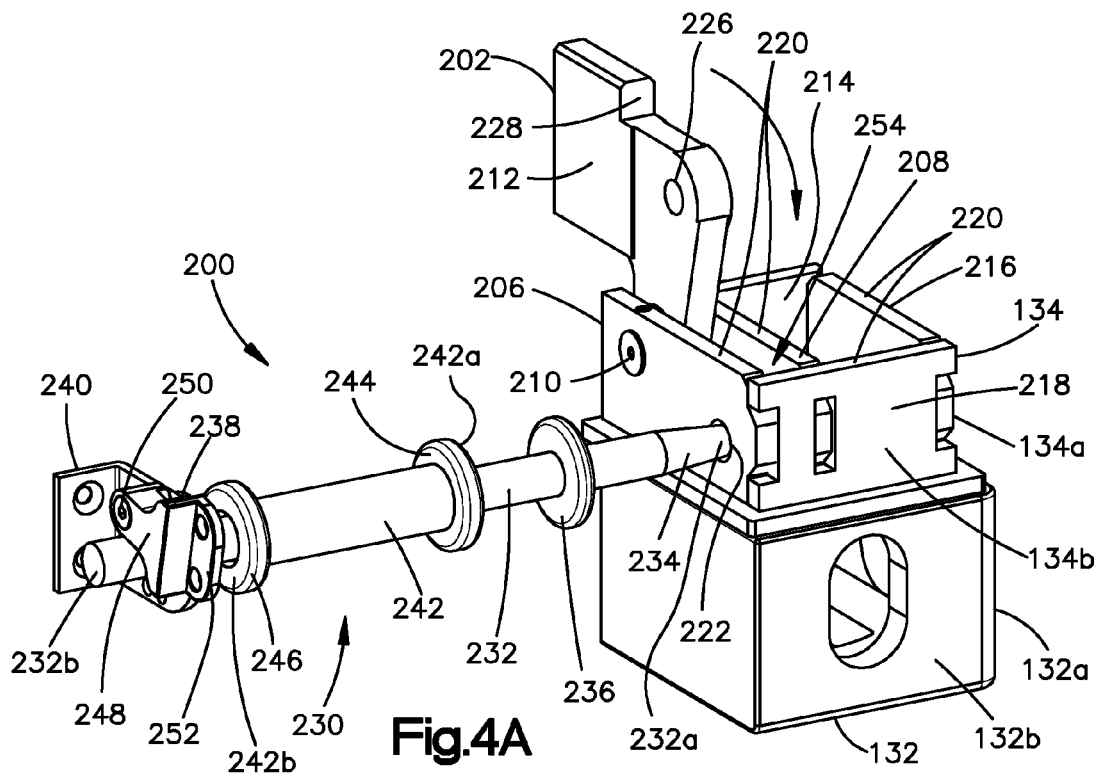
FIGS. 4A and 4B are perspective views of a securement assembly portion of the hinge assembly illustrated in FIGS. 3A and 3B.
Figure 4B:
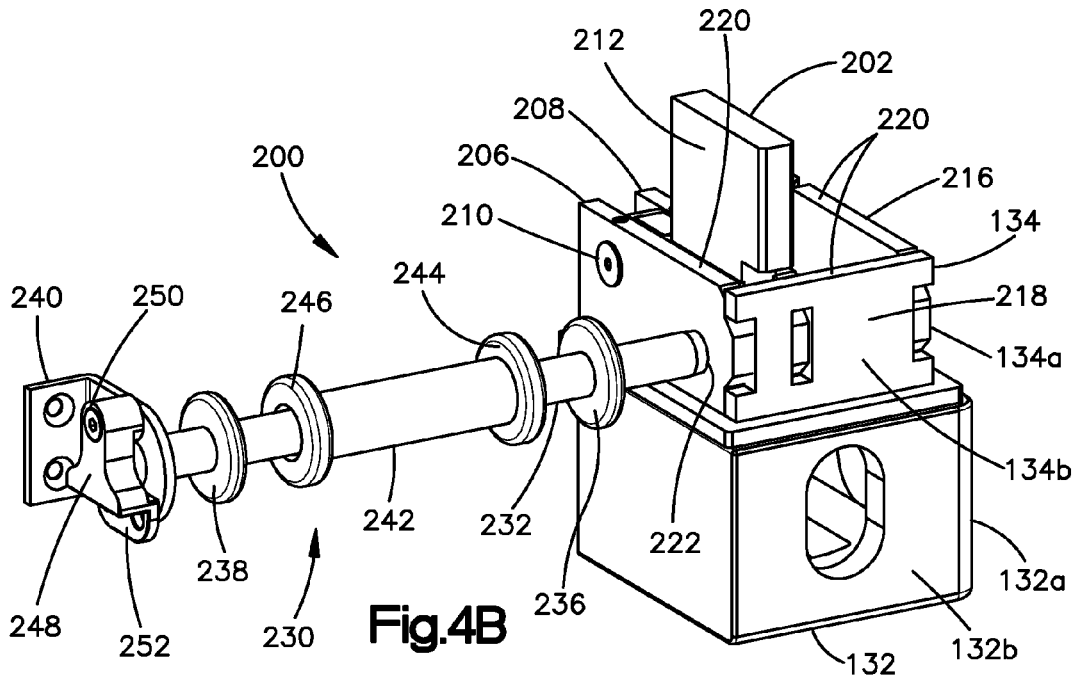
Figure 5:
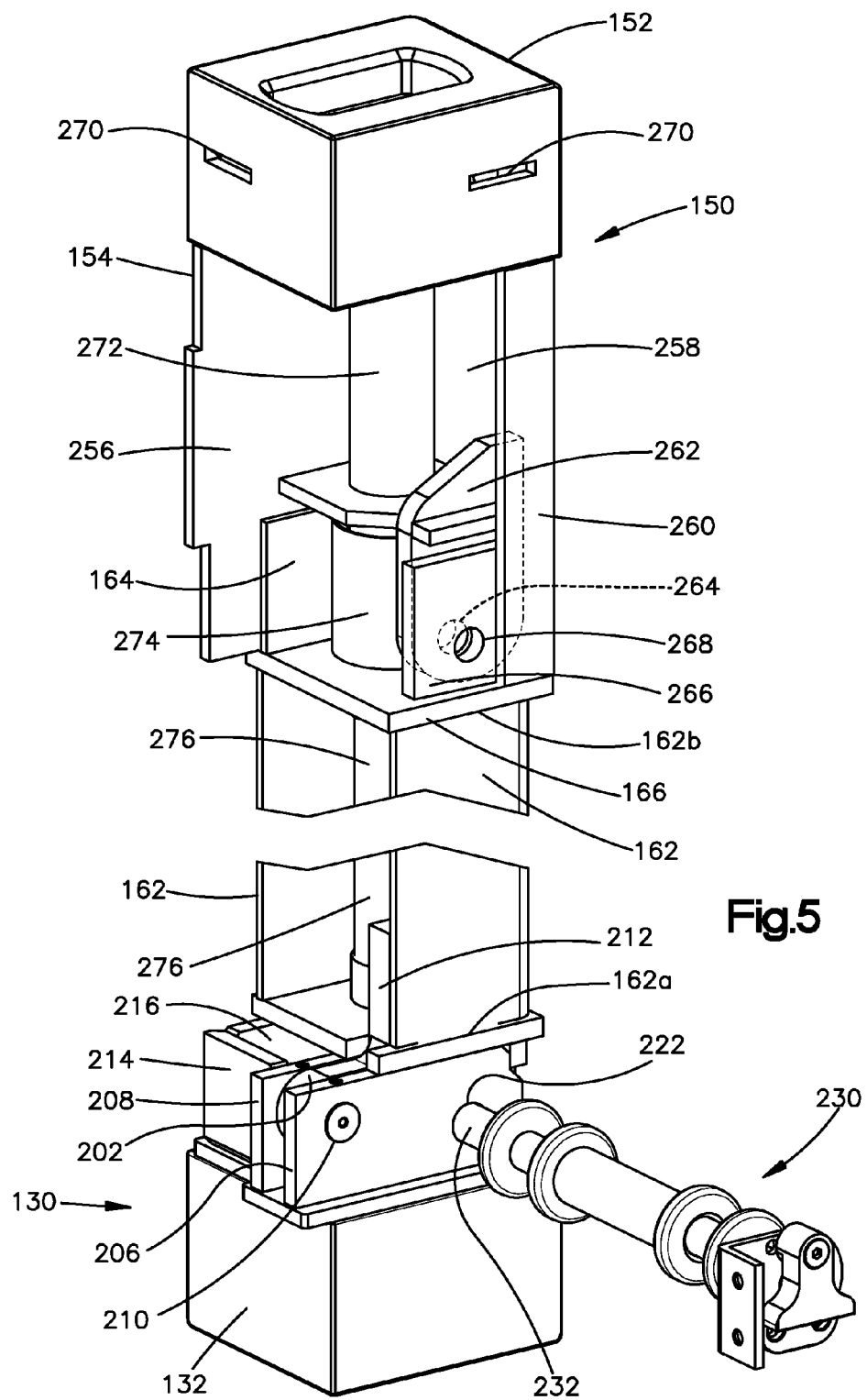
FIG. 5 is a perspective view of a portion of the roof, a portion the base, and upper and lower portions of an end wall of the collapsible container illustrated in FIG. 1.

The roof 140 may include a plurality of corner assemblies 150. Each corner assembly 150 may be disposed at a respective corner of the roof 140 and may be attached (e.g., welded) to corresponding ends of one of the roof rails 142 and one of the headers 144, respectively. Each corner assembly 150 (as shown in FIG. 5, for example) may include a corner casting 152 (e.g., an ISO corner casting that may be constructed the same or differently from the corner casting 132) and a sleeve 154 configured to at least partially receive the stub 134 (as shown in FIGS. 4A-4B, for example) of a corresponding corner assembly 130, for example when the container 100 is operated to a collapsed configuration as described herein. The sleeve 154 of each corner assembly 150 may protrude downward (e.g., toward the lower end 110) from the corner casting 152, and may extend beyond a corresponding header 144 through a distance D4 that may be substantially equal to the distance D1. The sleeve 154 of each corner assembly 150 may be attached to its corner casting 152, for example to one or more downward facing surfaces of the corner casting 152. The sleeve 154 may be welded to the corner casting 152. The corner assembly 150 (e.g., the corner casting 152 and the sleeve 154) may be monolithic.

The roof 140 may include one or more gutters. For example, the roof may include a pair of side gutters 146. Each side gutter 146 may be configured to extend along substantially the entirety of an upper edge of a corresponding roof rail 142 and may be configured to divert liquid toward one or both corner assemblies 150 attached to opposed ends of the roof rail 142. The roof may include a pair of end gutters 148. Each end gutter 148 may be configured to extend along substantially the entirety of an upper edge of a corresponding header 144 and may be configured to divert liquid toward one or both corner assemblies 150 attached to opposed ends of the header 144. It should be appreciated that the side gutters 146 may be attached to the roof rails 142 or may be monolithic with the roof rails 142, and that the end gutters 148 may be attached to the headers 144 or may be monolithic with the headers 144.

Each end wall 160 may include one or more posts 162, such as a pair of posts 162 that extend between corresponding corner assemblies 130 and 150. Each post 162 may define a first width W1 along a direction that is substantially normal to the first and second ends 102, 104 of the container 100 and a second width W2 along a direction that is substantially normal to the first and second sides 106, 108 of the container 100. The second width W2 may be the same or different from the first width W1. Each post 162 may define a first end that may be a fixed end 162a and an opposed second end that may be a free end 162b, for example as shown in FIG. 5. The fixed end 162a may be attached to a corresponding one of the corner assemblies 130, for example so as to be rotatable about the corner assembly 130. For example, each pair of posts 162 may be configured to be inwardly rotatable into the interior 118 of the container 100. Each pair of posts 162 may be attached to respective corner assemblies 130 and rotatable about the corner assemblies 130 such that at least a portion of the posts 162 abut (e.g., lay flat against) at least a portion of respective ones of the base rails 122 when rotated into the interior 118 of the container 100. The free ends 162b of the posts 162 may be configured to be removably attached to the roof 140, for instance to corresponding corner assemblies 150, when the container 100 is in the erected configuration.

It should be appreciated that the end walls 160 may also be configured to rotate outwardly about the corner assemblies 130 with respect to the interior 118 of the container 100. Rotation of one or both of the end walls 160, inwardly and/or outwardly with respect to the interior 118 of the container 100, may be counterbalanced, for example with one or more torsion springs operably connected to one or both posts 162 of the pair of end walls 160.

Referring now to FIGS. 2A-2C, the collapsible container 100 may further include one or more panels that may be attached to the container 100 so as to at least partially enclose the interior 118 of the container 100. For example, as illustrated in FIGS. 2A-2C, the collapsible container 100 may include a roof panel 170, a floor panel 172, and first and second end wall panels 174. The roof panel 170 may be attached to the roof 140, for example by securing it to one or more locations on the roof rails 142 and/or headers 144. The floor panel 172 may be attached to the base 120, for example by securing it to one or more locations on the base rails 122, the sills 124, the cross members 136, and/or the fork pockets 138. The end wall panels 174 may be attached to the end walls 160, for example by securing the end wall panels 174 to one or more locations on respective ones of the posts 162.

FIGS. 2A-2C depict an example of the collapsible container 100 being operated from the erected configuration to the collapsed configuration. FIG. 2A depicts the collapsible container 100 in the erected configuration, with the end walls 160 rotated to an upright orientation and the roof 140 raised. FIG. 2B depicts the container 100 in a partially collapsed (e.g., intermediate between erected and collapsed) configuration, for example as it is being collapsed. The end walls 160 may be rotated inwardly into the interior 118 of the container 100. The roof 140 may be lowered downward toward the base 120, for example concurrently with or after the end walls 160 are rotated into a lowered orientation. FIG. 2C depicts the container 100 in the collapsed configuration. When the container 100 is in the collapsed configuration, the end walls 160 may be rotated to their lowered orientation, for example such that the end walls 160 lie substantially flat along at least respective portions of the base rails 122. When the container 100 is in the collapsed configuration, the roof 140 may be in a lowered position such that the stubs 134 may be at least partially received in the sleeves 154. The sleeves 154 may abut respective ones of the corner castings 132. When the collapsible container 100 is in the collapsed configuration, the roof 140 and the base 120 may be secured to each other, for example as described herein.

Figure 3B:
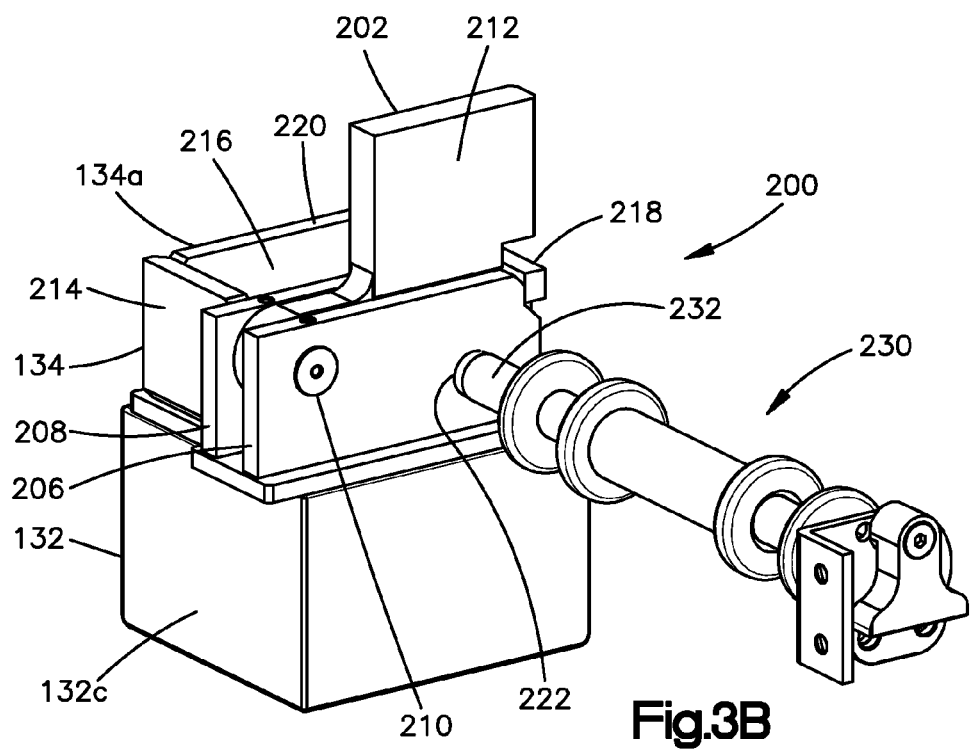

Referring now to FIGS. 3A and 3B, each post 162 may be rotatably supported by the base 120, for example by a hinge assembly 200. The collapsible container 100 may include a plurality of hinge assemblies 200. For example, the base 120 of the container 100 may support four hinge assemblies 200, with a hinge assembly 200 disposed at each corner of the container 100. The hinge assemblies 200 may be configured to allow the end walls 160 to be operated from the lowered orientation to the upright orientation and from the upright orientation to the lowered orientation. One or more components of the hinge assemblies 200 (e.g., each hinge assembly 200) may be supported by the base 120. For example, each hinge assembly 200 may be at least partially supported by a corresponding corner assembly 130 (e.g., at least partially integral with a corresponding corner assembly 130).

Each hinge assembly 200 may include a pivoting component, such as a plate 202, to which a corresponding one of the end walls 160 may be attached. The plate 202 may be configured to pivot, substantially in concert with the end wall 160, from a lowered orientation to an upright orientation and from the upright orientation to the lowered orientation. The plate 202 may be supported by the base 120. For example, the plate 202 may be pivotally attached to one or more tabs, such as a first tab 206 and a second tab 208 that are supported by the base 120. The plate 202 may be pivotally attached to the first and second tabs 206, 208 using a pivot pin 210. The plate 202 may define a substantially boot shaped geometry as illustrated, or may define any other suitable geometry.

The first and second tabs 206, 208 may be spaced apart from each other such that at least a portion of the plate 202 may be disposed between the first and second tabs 206, 208, respectively. For example, the plate may define a thickness TH and the first and second tabs 206, 208 may be spaced apart a distance D5 that is slightly larger than the thickness TH, such that the plate 202 may pivot substantially freely about the pivot pin 210 when the plate is disposed between the first and second tabs 206, 208.

The plate 202 may define one or more attachment portions, for example an attachment portion 212, to which the post 162 of a corresponding one of the end walls 160 may be attached. For example, the fixed end 162a of each post 162 may be configured to at least partially receive the attachment portion 212 of a corresponding plate 202. The attachment portion 212 may be secured in place relative to the fixed end 162a of a respective one of the posts 162 using welding, fasteners, or may otherwise be attached. When the post 162 of a respective one of the end walls 160 is attached to the plate 202, the plate 202 may be in the lowered orientation when the end wall 160 is in its lowered orientation and the plate 202 may be in the upright orientation when the end wall 160 is in its upright orientation.

The first and second tabs 206, 208 may define a portion of the stub 134 of each corner assembly 130. The stub 134 may include the first and second tabs 206, 208 and one or more plates that may be disposed proximate to the first and second tabs 206, 208 (e.g., substantially adjacent to one or both of first and second tabs 206, 208) and/or may be attached to the first and second tabs 206, 208. For example, the stub 134 may include an inner end plate 214, an outer side plate 216 that may define the outer side surface 134a, and an outer end plate 218 that may define the outer end surface 134b. The first and second tabs 206, 208, the inner end plate 214, the outer side plate 216, and the outer end plate 218 may project upward from the corner casting 132. One or both of the first and second tabs 206, 208 may project beyond an inner end surface 132c of the corner casting 132.

The first and second tabs 206, 208 may be attached (e.g., welded) to the corner casting 132, may be monolithic with the corner casting 132, etc. One or more of the inner end plate 214, the outer side plate 216, and the outer end plate 218 may be attached (e.g., welded) to one another and may be attached (e.g., welded) to the corner casting 132. Alternatively, one or more of the inner end plate 214, the outer side plate 216, and the outer end plate 218 may be monolithic with the corner casting 132. An inner end of the inner end plate 214 may be attached (e.g., welded) to the second tab 208. Respective ends of one or both of the first and second tabs 206, 208 may be attached (e.g., welded) to the outer end plate 218. It should be appreciated that one or more components of the stub 134 may be attached (e.g., welded) to one another and/or to the corner casting 132. The stub 134 may be at least partially integral (e.g., monolithic) with the corner casting 132.

Respective upper edges of one or more of the first tab 206, the second tab 208, the inner end plate 214, the outer side plate 216, and the outer end plate 218 may define an abutment surface 220 configured to abut with corresponding portions of the fixed end 162a of the post 162 when the corresponding end wall 160 is in the upright orientation. At least one of the first and second tabs 206, 208, may define an abutment surface defined to abut with at least a portion of an end wall 160 when the plate 202 is in the upright orientation.

It should be appreciated that the collapsible container 100 is not limited to the hinge assembly 200 as illustrated and described herein, and that one or more components of the container 100 may be differently configured such that the end walls 160 may be rotated relative to the base 120, for example between the lowered and upright orientations. For example, the tabs 206, 208 may be differently located with respect to the corner assemblies 130 and/or may be otherwise integrated with the corner assemblies 130 (e.g., with the stubs 134).

The hinge assembly 200 may be configured to allow the plate 202 to be secured in the upright orientation. For example, the first tab 206 may define an aperture 222 that extends therethrough. The second tab 208 may define an aperture 224 that extends therethrough. Respective centers of the apertures 222, 224 may be substantially aligned with each other, for example along a direction that extends substantially perpendicular to facing inner surfaces of the first and second tabs 206, 208. The apertures 222 and 224 may be spaced a radial distance R1 from a center of the pivot pin 210.

The plate 202 may define an aperture 226 that extends therethrough. The aperture 226 may be spaced the radial distance R1 from the pivot pin 210 and may be located such that the aperture 226 substantially aligns with the apertures 222 and 224 when the plate 202 is in the upright orientation. The plate 202 may define an alignment member configured to substantially align the aperture 226 with the apertures 222 and 224. For example, the attachment portion 212 of the plate 202 may define an abutment surface 228 that is configured to abut at least a portion of the outer end plate 218 when the plate 202 is in the upright orientation.

With reference also to FIGS. 4A and 4B, one or more of the hinge assemblies 200 may include a respective securement assembly 230. For example, the container 100 may include four securement assemblies 230, with each hinge assembly 200 including a respective one of the securement assemblies 230. As shown, the securement assembly 230 may be supported by the container 100. For example, the securement assembly 230 may be disposed in the recess 126. The securement assembly 230 may be attached to the sill 124 in the recess 126. In this regard, the securement assembly 230 may said to be supported by the base 120. The securement assembly 230 may include a securement member that is configured to secure the plate 202 in the upright orientation. For example, the securement assembly 230 may include a pin 232 that is configured to be biased into a locked position in the apertures 222, 224, and/or 226. With the pin 232 in the locked position in the apertures 222, 224, and/or 226, the first and second tabs 206, 208 and the third tab 262 may be positionally secured (e.g., substantially restrained from moving) relative to each other. For example, the plate 202 may be secured in the upright orientation by causing the pin 232 to be biased into at least the apertures 222 and 226. In another example, the plate 202 may be secured in the upright orientation by causing the pin 232 to be biased through the apertures 222 and 226 and into the aperture 224.

The pin 232 may have a first end 232a and an opposed second end 232b. The first end 232a of the pin 232 may define a tapered tip 234. The respective inner surfaces of one or more of the apertures 222, 224, and 226 may be similarly tapered, such that when the pin 232 is biased into one or more of the apertures 222, 224, or 226, the tapered surfaces of the pin 232 and the apertures 222, 224, and/or 226 may create an interference fit between the tip 234 of the pin 232 and one or more of the apertures 222, 224, or 226. The pin 232 may include a first collar 236 that is disposed closer to the first end 232a than to the second end 232b, and a second collar 238 that is spaced from the first collar 236 and is disposed closer to the second end 232b than the first end 232a.

The securement assembly 230 may include a bracket 240 that is configured to support the second end 232b of the pin 232. The bracket 240 may be secured to the base 120, for example to the sill 124. The bracket 240 may be secured to the sill 124 at a distance from the first tab 206 such that when the second end 232b of the pin 232 is disposed in the bracket 240 and the second collar 238 may abut the bracket 240, the first end 232a is captive in the aperture 222 but does not protrude through it.

The securement assembly 230 may include a biasing component configured to bias the pin 232 inward or outward with respect to one or more of the apertures 222, 224, or 226. For example, the securement assembly 230 may include a cylindrical sleeve 242 that may be disposed over a portion of the pin 232 between the first and second collars 236, 238. The sleeve 242 may define an inner diameter that is slightly larger than an outer diameter of the pin 232 between the first and second collars 236, 238, such that the sleeve 242 can freely translate over the pin 232 between the first and second collars 236, 238.

The sleeve 242 may be elongate between a first end 242a and a second end 242b, and may have a length, for example as defined by the first and second ends 242a, 242b, that is shorter than a distance between the first and second collars 236, 238 of the pin 232. The sleeve 242 may include a first collar 244 disposed at the first end 242a and a second collar 246 disposed at the second end 242b. The first and second collars 244, 246 may be configured to impact the first and second collars 236, 238 of the pin 232, so as to bias the pin 232 inward toward the apertures 222, 224, and 226 (e.g., into the locked position), or outward away from the apertures 222, 224, and 226 (e.g., into an unlocked position).

The securement assembly 230 may include a catch 248 configured to prevent the pin 232 from backing out of the locked position relative to one or more of the apertures 222, 224, or 226. For example, the catch 248 may be pivotally attached to the bracket 240 with a pivot pin 250. As depicted in FIG. 4A, the catch 248 may be pivoted out of the path of the pin 232, such that the second end 232b of the pin 232 may translate past the catch 248 when the pin 232 is operated to an unlocked position relative to the apertures 222, 224, and 226. With the pin 232 in the unlocked position, the plate 202 may be free to pivot from the upright orientation to the lowered orientation.

As depicted in FIG. 4B, the pin 232 may be operated from the unlocked position to the locked position to secure the plate 202 in the upright orientation. With the plate 202 in the upright position, the apertures 222, 224, and/or 226 may be substantially aligned with each other. The first end 232a of the pin 232 may be biased into one or more of the 222, 224, or 226, for example by causing the first collar 244 of the sleeve 242 to impact the first collar 236 of the pin 232 one or more times. As the pin 232 is biased into the apertures 222, 224, and/or 226, the second end 232b of the pin 232 may translate past the catch 248, allowing the catch 248 to pivot freely into the path of the pin 232. With the catch 248 obstructing the path of the pin 232, the pin 232 may be prevented from backing out of the locked position relative to the apertures 222, 224, and/or 226. The pin 232 may be operated from the locked position to the unlocked position by causing the second collar 246 of the sleeve 242 to impact the second collar 238 of the pin 232 one or more times. For example, the pin 232 may be biased outward from the apertures 222, 224, and/or 226 when the catch 248 is pivoted out of the path of the pin 232.

The catch 248 may include a tab 252 that is configured to project therefrom. The tab 252 may be configured to secure the catch 248 in the path of the pin 232. For example, the tab 252 may define one or more apertures that extend therethrough. The one or more apertures may align with one or more complementary apertures, for example defined by the bracket 240, such that the tab 252, and thus the catch 248, may be secured in position using the one or more apertures, for example using one or more pad locks, or the like. Securing the catch 248 in a position such that the catch 248 blocks the pin 232 from backing out may prevent unauthorized operation of the collapsible container 100 from the erected configuration to the collapsed configuration, for example. The tab 252 may be configured to operate as a security verification device. For example, a seal may be affixed to the tab 252, for example when the collapsible container 100 is in the collapsed configuration in preparation for shipping. If the seal is broken when the container 100 is received, it may indicate that the container 100 was operated from the collapsed configuration to an at least partially erected configuration during transit.

The first and second tabs 206, 208 may be configured to operate as a first attachment member configured to allow the roof 140 to be secured to the base 120 when the container 100 is in the collapsed configuration. For example, when the plate 202 is pivoted to the lowered orientation (e.g., as depicted in FIG. 3A), the plate 202 may vacate a void 254 between the first and second tabs 206, 208. The void 254 may be configured to at least partially receive a complementary second attachment member supported by the roof 140 (e.g., the tab 262 depicted in FIG. 5). The void 254 may be at least partially bounded, for example, by the first and second tabs 206, 208, the outer end plate 218, and a portion of the plate 202. Because the first attachment member may comprise the first and second tabs 206, 208, which may be supported by the base 120 (e.g., attached to the base 120) the first attachment member may be integral with the base 120.

With reference also to FIG. 5, one or more of the sleeves 154 (e.g., each sleeve 154) may be configured to at least partially receive the stub 134 of a corresponding corner assembly 130 when the container 100 is in the collapsed configuration. Each sleeve 154 may include an outer side plate 256 and an outer end plate 258, and may include an inner side plate 260. The outer side plate 256 may define an inner surface that is configured to abut the outer side surface 134a of a corresponding stub 134, the outer end plate 258 may define an inner surface that is configured to abut the outer end surface 134b of the stub 134, and the inner side plate 260 may define an inner surface that is configured to abut at least a portion of an outer surface of the first tab 206. The outer side plate 256 may define a thickness that may be substantially equal to or less than, but not greater than, the distance D2. The outer end plate 258 may define a thickness that may be substantially equal to or less than, but not greater than, the distance D3.

The roof 140 may support a second attachment member. The second attachment member may be configured to cooperate with the first attachment member supported by the base 120 to allow the roof 140 to be secured to the base 120 when the container 100 is in the collapsed configuration. For example, the roof 140 may include a third tab 262 that may be configured to operate as the second attachment member. The third tab 262 may be configured to be disposed in the void 254 when the plate 202 is in the lowered orientation. The third tab 262 may be integral with the roof 140. For example, the third tab 262 may be integral with the corner assembly 150. The second attachment member may be disposed at the corner of the roof 140. The third tab 262 may define an aperture 264 that extends therethrough. The third tab 262 may define the aperture 264 such that the aperture 264 substantially aligns with the apertures 222 and 224 when the container 100 is in the collapsed configuration with the third tab 262 disposed between the first and second tabs 206, 208.

The posts 162 of each end wall 160 may include a stub 164 configured to be at least partially received by a corresponding one of the sleeves 154, for example when the container 100 is in the erected configuration with the posts 162 in the upright orientation. For example, each post 162 may include a stub 164 that may be disposed at, and may project upward from, the free end 162b. The stub 164 may be dimensioned similarly to the stub 134, such that it may be at least partially received by the sleeve 154 of a corresponding corner assembly 150. Each post 162 may include an abutment plate 166 disposed substantially at the free end 162b. The abutment plate 166 may be configured to abut with one or more surfaces of a corresponding corner assembly (e.g., with one or more surfaces of a corresponding sleeve 154) when the container 100 is in the erected configuration.

One or more of the end walls 160 may support a third attachment member configured to allow the roof 140 to be secured to the end wall 160 when the container 100 is in the erected configuration. For example, the post 162 of one or more of the end walls 160 (e.g., each post 162) may include a fourth tab 266 that may be configured to operate as the third attachment member. The fourth tab 266 may be configured to be disposed adjacent to the third tab 262 when the end wall 160 is in the upright orientation. The fourth tab 266 may define a portion of the stub 164, for example. The fourth tab 266 may be integral with the end wall 160. The fourth tab 266 may define an aperture 268 that extends therethrough. The fourth tab 266 may define the aperture 268 such that the aperture 268 substantially aligns with the aperture 264 when the end wall 160 is in the upright orientation and the container 100 is in the erected configuration. With the container 100 in the erected configuration, the fourth tab 266 may be disposed adjacent to the third tab 262.

It should be appreciated that the collapsible container 100 is not limited to the illustrated first, second, third, and/or fourth tabs 206, 208, 262, 266. For example, the first, second, third, and fourth tabs 206, 208, 262, 266 may be alternatively constructed with geometries that differ from those illustrated. It should further be appreciated that the first, second, third, and/or fourth tabs 206, 208, 262, 266 are not limited to the illustrated number and/or location of apertures. It should further still be appreciated that the container 100 is not limited to the illustrated number of tabs. For example, the hinge assembly 200 may include more or fewer tabs than the illustrated first and second tabs 206, 208.

Figure 6:
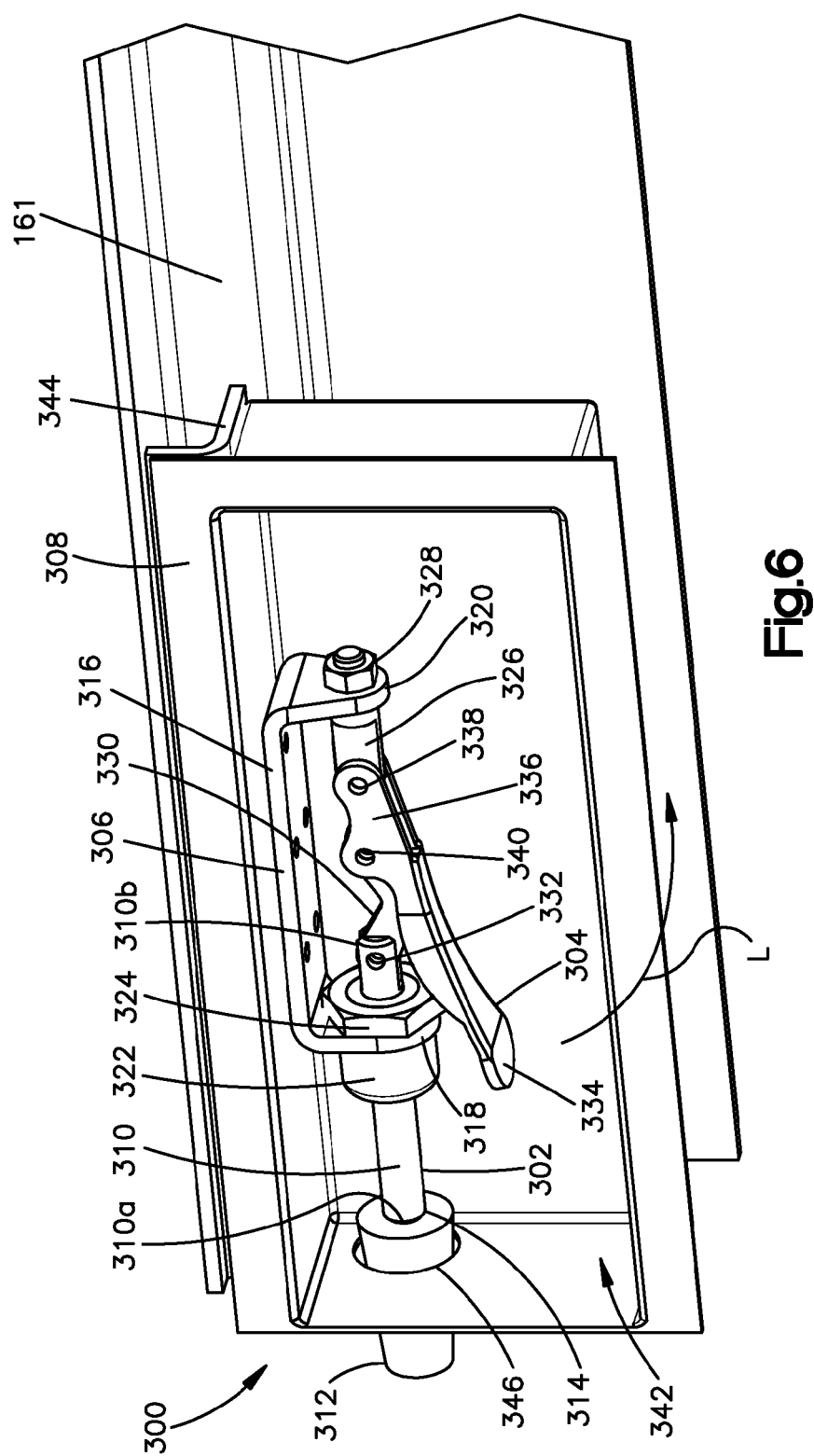
FIG. 6 is a perspective view of a securement assembly that may be used to secure the roof of the collapsible container illustrated in FIG. 1 to the base of the container.

FIG. 6 depicts a securement assembly 300 that may be used to secure an end wall 160 to the roof 140. The container 100 may one or more securement assemblies 300. For example, the container 100 may include four securement assemblies 300, with each end wall 160 including two securement assemblies 300. As shown, the securement assembly 300 may be supported by the end wall 160 such that the securement assembly 300 is located proximate to a corresponding stub 164. Each end wall 160 may include a pair of securement assemblies 300, with each securement assembly 300 attached to the end wall 160 proximate to a respective one of the stubs 164.

Each securement assembly 300 may include a securement member, such as a pin 302, a lever 304 operably coupled to the pin 302, a bracket 306 configured to support the pin 302 and the lever 304, and a housing 308 configured to at least partially enclose the pin 302, the lever 304, and the bracket 306.

The securement assembly 300 may be configured to positionally secure the third and fourth tabs 262, 266 relative to each other, which may secure the end wall 160 to the roof 140 (e.g., a post 162 may be secured to the roof 140). For example, the securement assembly 300 may be configured such that the lever 304 may be operated to cause a portion of the pin 302 to be biased into the apertures 264, 268 of the third and fourth tabs 262, 266, respectively. With the pin 302 biased into the apertures 264, 268, the third and fourth tabs 262, 266 may be substantially restrained from moving relative to each other.

The pin 302 may include a shaft 310 that is elongate between a first end 310a and an opposed second end 310b. The pin 302 may include a tapered tip 312. The tapered tip 312 may be removably attached to the first end 310a of the shaft 310. For example, the first end 310a of the shaft 310 may be threaded and the tip 312 may define a threaded bore 314 configured to be threaded onto the first end 310a of the shaft 310.

The respective inner surfaces of one or both of the apertures 264, 268 may be tapered similarly to the tip 312 of the pin 302, such that when the pin 302 is biased into one or both of the apertures 264, 268, the tapered surfaces of the pin 302 and the apertures 264 and/or 268 may create an interference fit between the tip 312 of the pin 302 and one or both of the apertures 264, 268.

The pin 302 may be supported by the bracket 306. The bracket may include a plate shaped central portion 316 and first and second tabs 318, 320, located at opposed ends of the bracket 306, that extend downward from the central portion 316. The securement assembly 300 may include a collar 322 configured to slidably support the shaft 310 of the pin 302 and a nut 324 configured to facilitate attachment of the collar 322 to the first tab 318 of the bracket 306.

The lever 304 may be operably connected between the second end 310b of the shaft 310 of the pin 302 and the second tab 320 of the bracket 306, such that operation of the lever 304 causes the pin 302 to move from a locked position to an unlocked position. The securement assembly 300 may include a first linkage member 326 that is connected to the second tab 320 of the bracket 306, for example using a nut 328, and to the lever 304. The securement assembly 300 may include a second linkage member 330 having a first end that is pivotally attached to the second end 310b of the shaft 310, for example via a pivot pin 332, and an opposed second end that is operably coupled to the lever 304.

The lever 304 may define a handle portion 334 at a first end of the lever 304 and a linkage portion 336 at an opposed second end of the lever 304. The linkage portion 336 of the lever 304 may be pivotally attached to the first linkage member 326, for example via a pivot pin 338, and may be pivotally attached to second end of the second linkage member 330, for example via a pivot pin 340.

The pin 302 is illustrated in the locked position, such that the tip 312 of the pin 302 is inserted in the apertures 264, 268 of the third and fourth tabs 262, 266 (not shown in FIG. 6), which may secure the end wall 160 to the roof 140 (e.g., a post 162 may be secured to the roof 140). The securement assembly 300 may be operated such that the pin 302 moves to the unlocked position relative to the third and fourth tabs 262, 266, such that the tip 312 of the pin 302 backs out from at least the aperture 264 of the third tab 262, for example out of the aperture 264 and into the aperture 268 of the fourth tab 266.

The pin 302 may be operated to the unlocked configuration by biasing the handle portion 334 of the lever 304, for example, away from the post 162 of the end wall 160, for example along the direction L. The linkage portion 336 of the lever 304, the first linkage member 326, and the second linkage member 330 may move concurrently with movement of the handle portion 334 of the lever 304, for example pivoting around the pivot points 332, 338, and/or 340. Such operation of the lever 304 and first and second linkage members 326, 330 may cause the shaft 310 of the pin 302 to be pulled away from the third and fourth tabs 262, 266, which may cause the tip 312 of the pin 302 to back out from at least the aperture 264 of the third tab 262 and into the aperture 268 of the fourth tab 266.

The housing 308 may define a recess 342 that is dimensioned to at least partially enclose one or more components of the securement assembly 300. The housing 308 may be configured to be attached to the end wall 160. The end walls 160 may each include a header bar 161 that extends from the stub 164 of a first post 162 of the end wall 160 to the stub 164 of a second post 162 of the end wall 160. The housing 308 of the securement assembly 300 may be attached to the header bar 161 via a bracket 344 that is attached to the header bar 161. The housing 308 may define an aperture 346 through which the tip 312 of the pin 302 may protrude when the pin 302 is in the locked position relative to the apertures 264, 268 of the third and fourth tabs 262, 266, respectively.

Referring again to FIG. 5, the collapsible container 100 may be configured to drain liquid (e.g., rain water) that may accumulate on the roof 140 of the container 100. For example, each corner casting 152 may define one or more openings 270 configured to allow liquid to flow from a corresponding side gutter 146 and/or end gutter 148 into an interior of the corner casting 152. Each corner assembly 150 may include a first drain pipe 272. Each post 162 may define an at least partially hollow interior that may support a pipe collar 274 located near the free end 162b and a second drain pipe 276 coupled to the pipe collar 274. The second drain pipe 276 may extend substantially a length of the post 162, for example, from the pipe collar 274 to substantially the fixed end 162a. The pipe collar 274 may have respective outer and inner diameters that are larger than the outside diameter of the first drain pipe 272, such that at least a portion of the first drain pipe 272 may be received in the pipe collar 274 when the roof 140 is lowered into position on the end posts 162 of the end walls 160.

The respective pipe collars 274 of one or more of the posts 162 may be configured to facilitate alignment of the roof 140 with respect to the posts 162 as the roof 140 is lowered into position with respect to the posts 162. For example, the upper opening of the pipe collar 274 may define a cone shaped taper from the outer diameter to the inner diameter, such that as each first drain pipe 272 is received in a corresponding pipe collar 274, one or more of the pipe collars 274 may operate to align the first drain pipes 272 respective to the one or more pipe collars 274, thereby facilitating alignment of each corner assembly 150 with the stub 164 of a corresponding post 162.

Each corner assembly 130 may be configured to cause liquid received from the second drain pipe 276 to drain from the corner assembly 130 when the post 162 is in the upright orientation. For example, the corner assembly 130 may be configured to direct liquid downward through the stub 134 and out one or more openings defined by the corner casting 132.

Accordingly, liquid (e.g., rain water) that accumulates on the roof 140 of the container 100 may be directed by the roof 140 into one or more of the side gutters 146 and/or end gutters 148, into one or more of the plurality of corner assemblies 150, downward through the first drain pipes 272 into the second drain pipes 276, downward through the second drain pipes 276 into one or more of the corner assemblies 130, and outward through one or more of the corner castings 132. It should be appreciated that the corner assemblies 130 and 150 may be configured such that liquid draining from the corner assemblies 130 of a first container 100 may be received by the corner assemblies 150 of a second container 100 upon which the first container 100 is stacked, abutted, and so on.

The pipe collars 274 may operate to retain the container 100 in the erected configuration when the container 100 is not secured in the erected configuration, for example when the pins 232 of the securement assemblies 230 are in the unlocked positions (such that the end walls 160 are not secured in their upright orientations by the securement assemblies 230) and the pins 302 of the securement assemblies 300 are in the unlocked positions (such that the roof 140 is not secured to the posts 162 of the end walls 160 by the securement assemblies 300). When the first drain pipes 272 are received in the pipe collars 274, engagement between the first drain pipes 272 and the pipe collars 274 may act to prevent the end walls 160 from rotating from the upright orientations to the lowered orientations. This may reduce the likelihood of accidental collapse of the container 100.

Figure 7C:
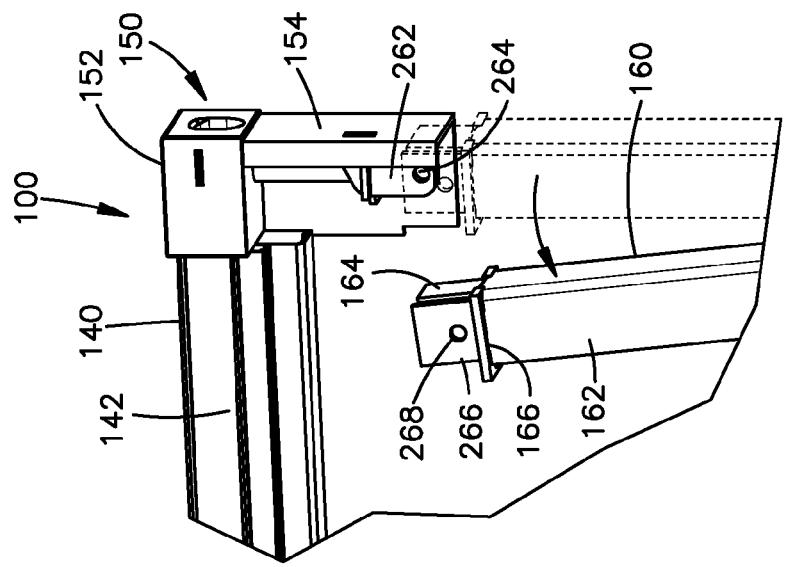
Figure 7B:
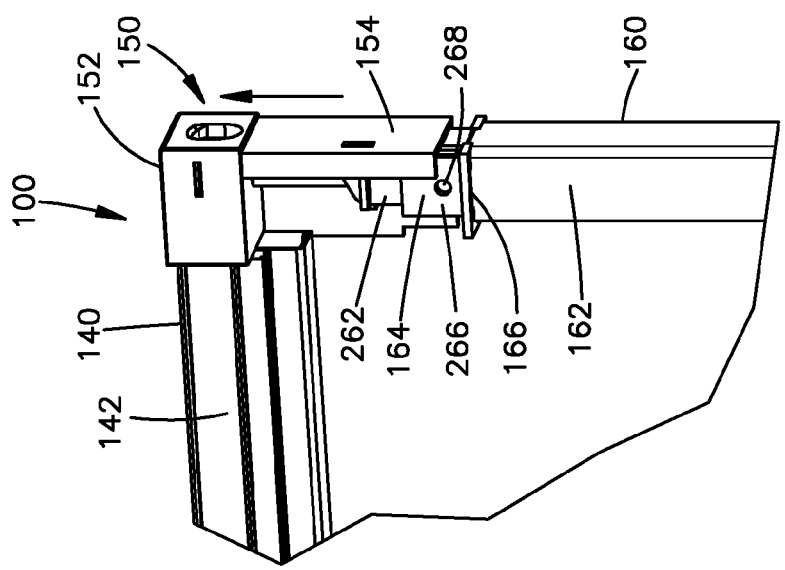
Figure 7A:
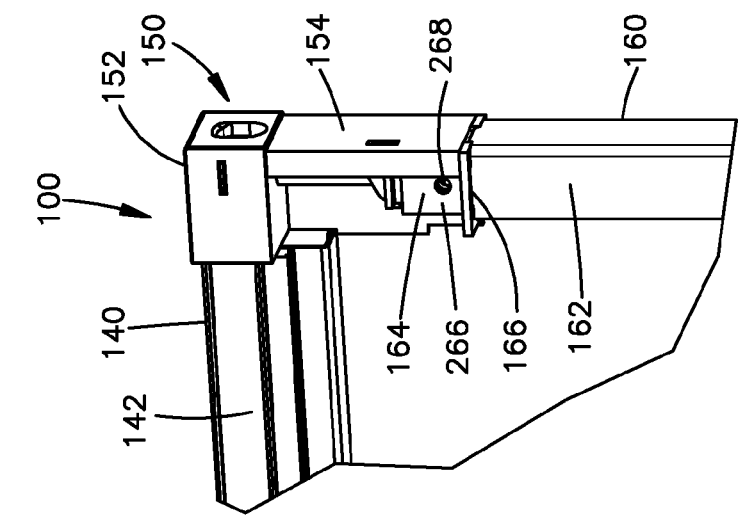

FIGS. 7A-7H illustrate an example procedure for operating the collapsible container 100 from the erected configuration to the collapsed configuration. When the container 100 is in the erected configuration, the first attachment member (e.g., the first and second tabs 206, 208) and the second attachment member (e.g., the third tab 262) may be spaced apart from each other, for example as depicted in FIG. 2A. When the container 100 is in the erected configuration, the roof 140 may be secured to the end walls 160, for example via the securement assemblies 300, and the end walls 160 may be secured in the upright orientations, for example via the securement assemblies 230. When the container 100 is in the erected configuration, the stub 164 of each post 162 may be at least partially received in a corresponding one of the sleeves 154 and the sleeves 154 may abut (e.g., make contact with) corresponding ones of the abutment plates 166, for example as illustrated in FIG. 7A.

The roof 140 may be released from the end walls 160. For example, the securement assemblies 300 may be operated such that the pins 302 are backed out from at least the apertures 264 of the third tabs 262 and into the apertures 268 of the fourth tabs 266, thereby freeing the third and fourth tabs 262, 266 to move relative to each other. The container 100 may include four securement assemblies 300, such that four pins 302 may be operated to the respective unlocked positions to release the roof from the end walls 160.

The roof 140 may then be raised upward away from the base 120 as depicted in FIG. 7B. The roof 140 may be raised, for example, using a crane, a forklift, or the like. The roof 140 may be raised a distance such that the first drain pipes 272 are substantially cleared of the pipe collars 274, such that the end walls 160 may be rotated from the upright orientations to the lowered orientations.

Figure 7D:
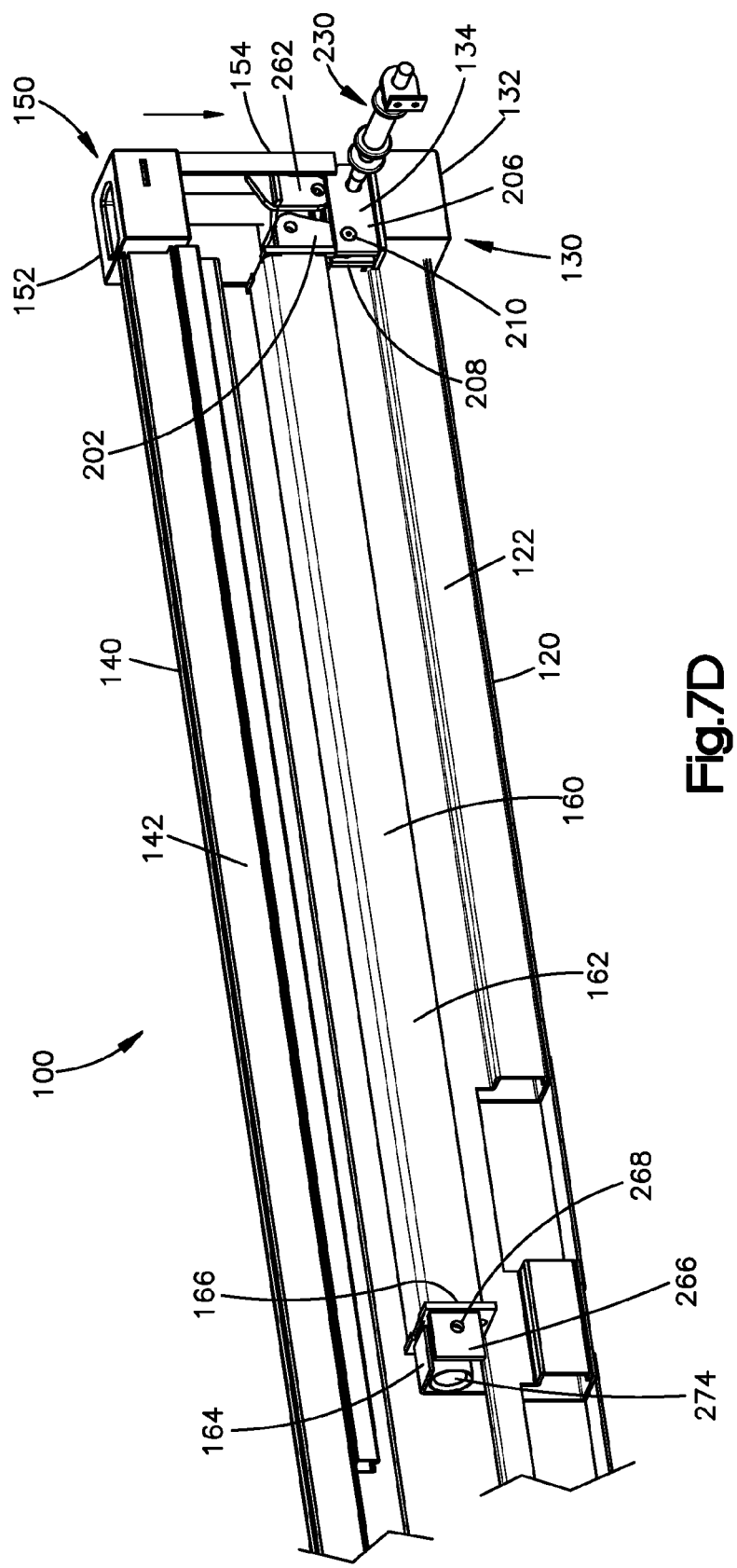

The end walls 160 may then be released from the upright orientations. Each of the securement assemblies 230 may be operated (e.g., using the sleeves 242) to bias the pins 232 to the unlocked positions, with the tips 234 of the pins 232 backed out of the apertures 224 and 226 and into the apertures 222, thereby freeing the plates 202 and the first and second tabs 206, 208 to move relative to each other. The container 100 may include four securement assemblies 230, such that four pins 232 may be operated to the respective unlocked positions to release free the end walls 160. With the plates 202 free to pivot about the pivot pins 210, the end walls 160 may be rotated from the upright orientations to the lowered orientations, into the interior 118 of the container 100, as depicted in FIGS. 7C and 7D. As the end walls 160 are rotated into the lowered orientation, the plates 202 may vacate the corresponding voids 254. With the end walls 160 in the lowered orientation, one or more portions of the posts 162 may rest against corresponding portions of the base rails 122.

The roof 140 may be lowered downward toward the base 120 (e.g., using the crane, forklift, etc.), as depicted in FIG. 7D. As the roof 140 is lowered, the sleeve 154 at each corner may at least partially receive a corresponding stub 134, which may cause the roof 140 to substantially align with the base 120, as illustrated in FIGS. 7E and 7F. Each third tab 262 may be received in a corresponding void 254, as illustrated in FIG. 7F. As the roof 140 is further lowered such that each sleeve 154 abuts a corresponding corner casting 132 (e.g., as illustrated in FIG. 7G) the aperture 264 of each third tab 262 may substantially align with the apertures 222 and 224 of corresponding ones of the first and second tabs 206, 208. A portion of each first drain pipe 272 may be received in a corresponding corner assembly, for example in the stub 134 and/or the corner casting 132.

With the roof 140 lowered such that the container 100 is in the collapsed configuration, the roof 140 may be secured to the base 120. One or more of the securement assemblies 230 may be operated (e.g., using the sleeves 242) to bias the respective pins 232 into the locked positions in one or more respective the apertures 222, 224, or 226. Biasing one or more pins 232 into respective apertures 222, 224, and/or 226 may substantially restrain the first, second, and third tabs 206, 208, 262 at each corner of the container 100 from moving relative to each other, thereby securing the roof 140 to the base 120. For example, at least one pin 232 (e.g., the pin 232 of each of the four securement assemblies 230) may be biased into at least respective apertures 222 and 264, and/or at least one pin 232 (e.g., the pin 232 of each of the four securement assemblies 230) may be biased through respective apertures 222 and 264 and into the respective aperture 224.

It should be appreciated that the container 100 may be operated from the collapsed configuration to the erected configuration, for example, by following one or more of the collapsing operations described herein in reverse. The collapsible container 100 may be moved, for example when secured in either the collapsed or erected configurations. For example, with the container 100 in the collapsed configuration and the roof 140 secured to the base 120, the container can be moved using a crane operably attached to one or more of the corner castings 132 and/or one or more of the corner castings 152, a forklift operably engaged with one or more of the fork pockets 138, or any other suitable apparatus. The container 100 may be referred to as a substantially self-contained collapsible container. For example, substantially all of the components of the collapsible container 100 may be supported by the container 100.

Figure 8:
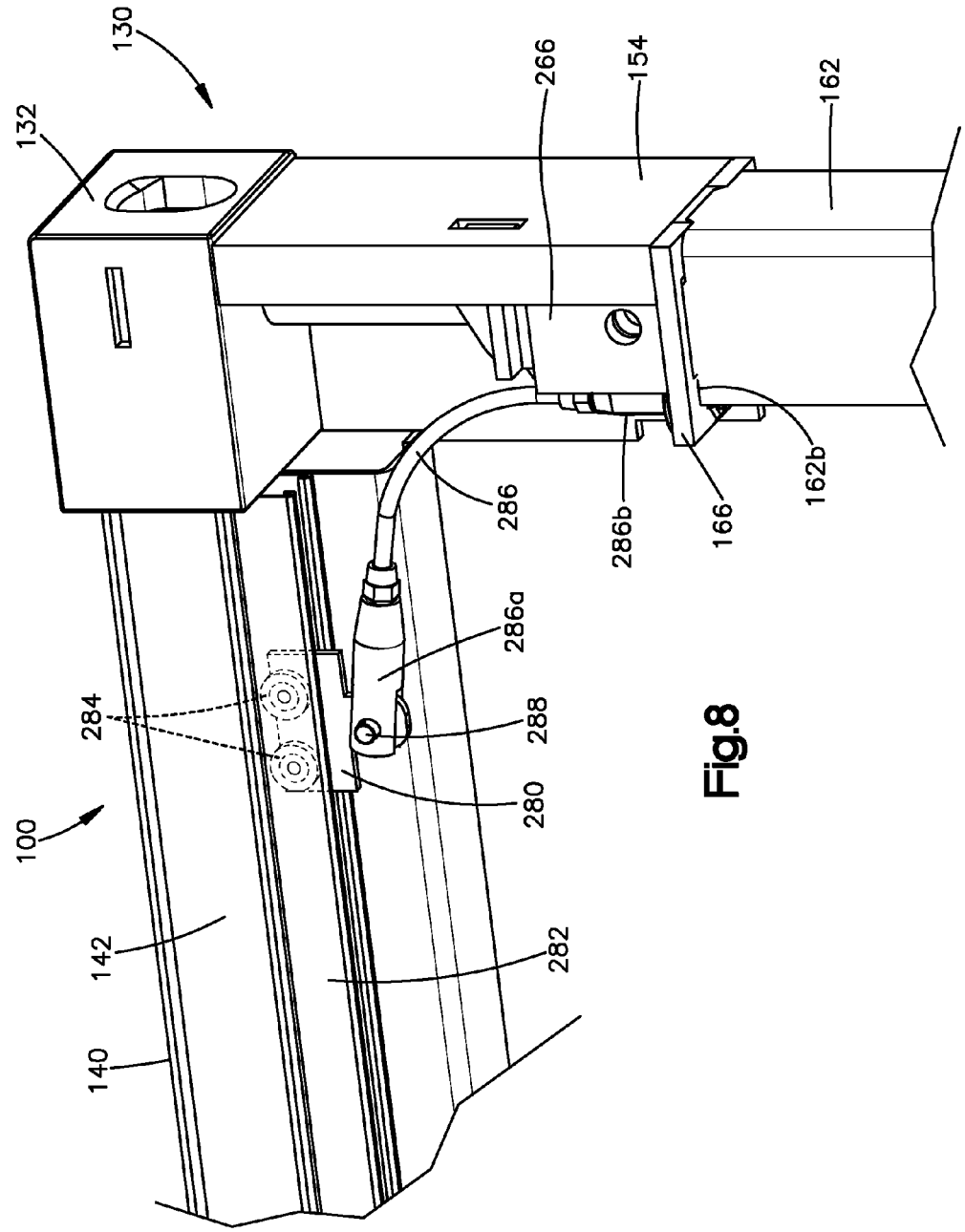
FIG. 8 is a perspective view of a portion the collapsible container illustrated in FIG. 1, with the end walls of the container configured for self-operation.

Referring to FIG. 8, the collapsible container 100 may be configured such that one or both of operating the end walls 160 from the lowered orientation to the upright orientation or operating the end walls 160 from the upright orientation to the lowered orientation is at least partially automated. For example, the container 100 may be configured such that the end walls 160 may be lowered or raised substantially concurrently with lowering and raising of the roof 140, respectively.

One or both of the posts 162 of each end wall 160 may be operably connected to a moveable component, such as a caster 280, supported by the roof 140. The roof 140 may include one or more sections of track 282. Each section of track 282 may be configured to support (e.g., captively) a respective caster 280. Each section of track 282 may be attached to a portion of a corresponding roof rail 142. For example, the roof 140 may include four sections of track 282, with two sections of track 282 disposed along the respective roof rail 142 of each of the first and second sides 106, 108. Each section of track 282 may be configured to support a respective caster 280. The roof 140 may include two sections of track, with a single section of track 282 disposed along the roof rail 142 of each of the first and second sides 106, 108. Each single section of track 282 may be configured to support two casters 280. Each caster 280 may include one or more wheels 284 (e.g., a pair of wheels 284) configured to ride in a corresponding section of track 282.

Each caster 280 may be operably attached to a corresponding end wall 160, for example using a flexible cable 286 having a near end 286a attached to the caster 280 and an opposed far end 286b. The far end 286b of the cable 286 may be attached to the free end 162b of a post 162, for instance to the abutment plate 166. The near end 286a of the cable 286 may be pivotally attached to the caster 280, for example using a pivot pin 288. The cable 286 may be of sufficient length (e.g., approximately six inches) such that the roof 140 may be adequately raised relative to the end walls 160 with the end walls in the upright orientation, for example such that the first drain pipe 272 is substantially clear of the second drain pipe 276 to allow the end walls 160 to rotate into the interior 118 of the container 100.

In operation, the casters 280 may cause the end walls 160 to operate from the lowered orientation to the upright orientation as the container 100 is operated from the collapsed configuration to the erected configuration. For example, with the end walls 160 in the lowered orientation and the roof 140 lowered the casters 280 may be spaced from the corner assemblies 150. As the roof is raised 140, the cables 286 may become taught, causing the casters 280 to roll in the respective sections of track 282, toward the corner assemblies 150. As the casters 280 advance toward the corner assemblies 150, tensile force in the cables 286 may be applied to the end walls 160 (e.g., to the free ends 162b of the posts 162), which may cause the end walls 160 to operate from the lowered orientation to the upright orientation as the roof 140 is raised, for example as illustrated in FIG. 2B. The casters 280 may assist with operating the end walls 160 from the upright orientation to the lowered orientation as the container 100 is operated from the erected configuration to the collapsed configuration.

Referring now to FIGS. 9A-9F and FIG. 10, the collapsible container 100 may include one or more side walls 180 that may be configured as collapsible side walls. For example, the container 100 may include a side wall 180 attached to the second side 108 of the container 100. The side wall 180 may be configured such that it collapses into the interior 118 as the container 100 is operated from the erected configuration to the collapsed configuration. For example, the side wall 180 may include an upper section 182 and a lower section 184 that are configured to rotate about a component that connects the upper and lower sections 182, 184. For example the upper and lower sections 182, 184 may be configured to fold toward each other (e.g., into the interior 118) as the container 100 is collapsed.

The upper and lower sections 182, 184 of the side wall 180 may be rotatably attached to each other, and rotatably attached to the roof 140 and the base 120 of the container 100, respectively. For example, the upper section 182 may define an upper edge that is rotatably attached (e.g., hinged) to the roof rail 142 on the second side 108 of the roof 140 and a lower edge that is rotatably attached (e.g., hinged) to the lower section 184. The lower section 184 may define a lower edge that is rotatably attached (e.g., hinged) to the base rail 122 on the second side 108 of the base 120 and an upper edge that is rotatably attached (e.g., hinged) to the lower edge of the upper section 182. The base rail 122 on the second side 108 of the base 120, to which the side wall 180 may be attached, may be configured to be taller than the base rail 122 on the first side 106 of the base 120, such that the side wall 180 (e.g., the lower section 184) and the end walls 160 do not interfere with one another, for example when the container 100 is in the collapsed configuration. The posts 162 of the end walls 160 disposed proximate the opposed corners of the second side 108 of the container may be inwardly offset with respect to the base rail 122 that extends along the second side 108, for example such that the end walls 160 do not interfere with the side wall 180 (e.g., when the end walls 160 are raised or lowered as the container 100 is operated between the collapsed and erected configurations).

Figure 9A:
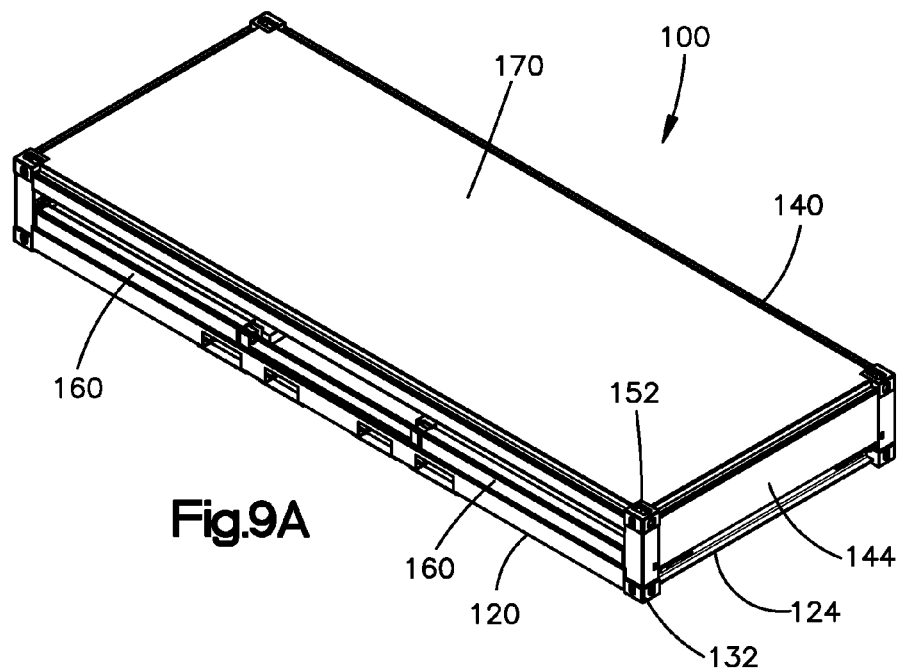
FIG. 9A is a perspective view of the collapsible container of FIG. 1, the container including a roof panel, a floor panel, a pair of end wall panels, and a collapsible side wall, with the container in the collapsed configuration.

FIGS. 9A-9E illustrate the collapsible container 100 in various configurations, for example as may occur as the container 100 is operated from the collapsed configuration to the erected configuration or is operated from the erected configuration to the collapsed configuration. FIG. 9A depicts the collapsible container 100 in the collapsed configuration, in which the end walls 160 may be in the lowered orientation and may abut at least portions of the base rails 122. The side wall 180 may be collapsed, for example with the upper and lower sections 182, 184 folded against each other. The lower section 184 may abut one or more portions of the end walls 160. The stubs 134 may be nested in the sleeves 154 and the sleeves 154 may abut respective ones of the corner castings 132.

Figure 9B:
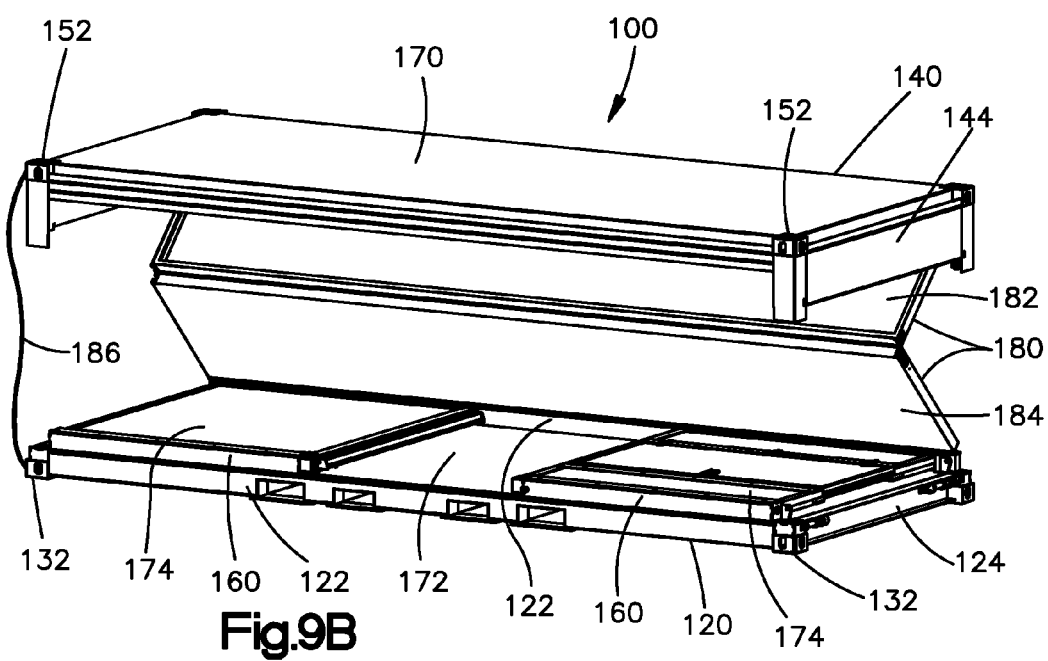
FIG. 9B is a perspective view of the collapsible container of FIG. 9A in a partially erected configuration, with the roof partially raised and the side wall unfolding.

The roof 140 may be unsecured from the base 120, for example by operating the securement assemblies 230 as described herein. The roof 140 may be partially raised, as illustrated in FIG. 9B. As the roof 140 is raised, the side wall 180 may unfold. The container 100 may be configured such that the roof 140 remains substantially coplanar with the base 120 as the side wall 180 unfolds. For example, a cable 186 may be attached to the container at the end opposite the end where the side wall 180 is attached, such as at the first side 106 when the side wall 180 is attached to the second side 108. The cable 186 may have a fixed end (e.g., attached to the base 120) and an opposed free end configured to be attached to the roof, for example to the corner casting 152 disposed at the intersection of the second end 104 and the first side 106. The cable 186 may have a length that is substantially equal to a height of the side wall 180 when the side wall 180 is fully unfolded, for example approximately eight feet. The cable 186 may prevent the roof 140 from rotating out of plane relative to the base 120. For example, when the side wall 180 reaches the position of being substantially unfolded, the cable may become substantially taught, such that the roof 140 does not elevate higher along the first side 106 than along the second side 108. It should be appreciated that the attachment of the cable 186 is not limited to the described location, and that more than one cable 186 may be used.

Figure 9C:
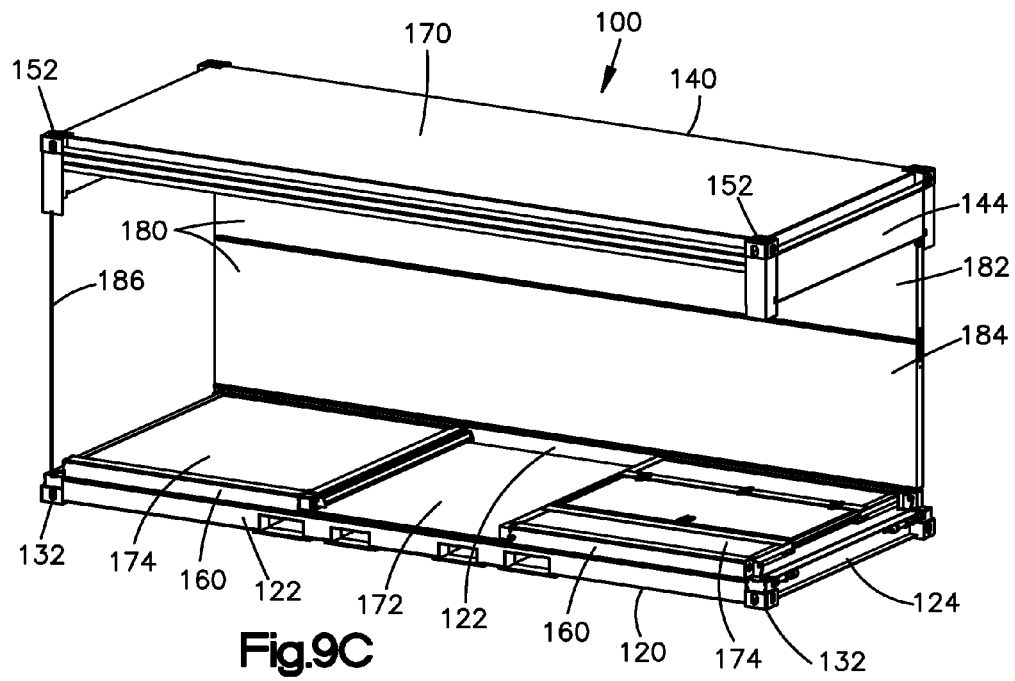
FIG. 9C is a perspective view of the collapsible container of FIG. 9A in a partially erected configuration, with the roof raised, the side wall unfolded, and the end walls in lowered orientations.
Figure 9D:
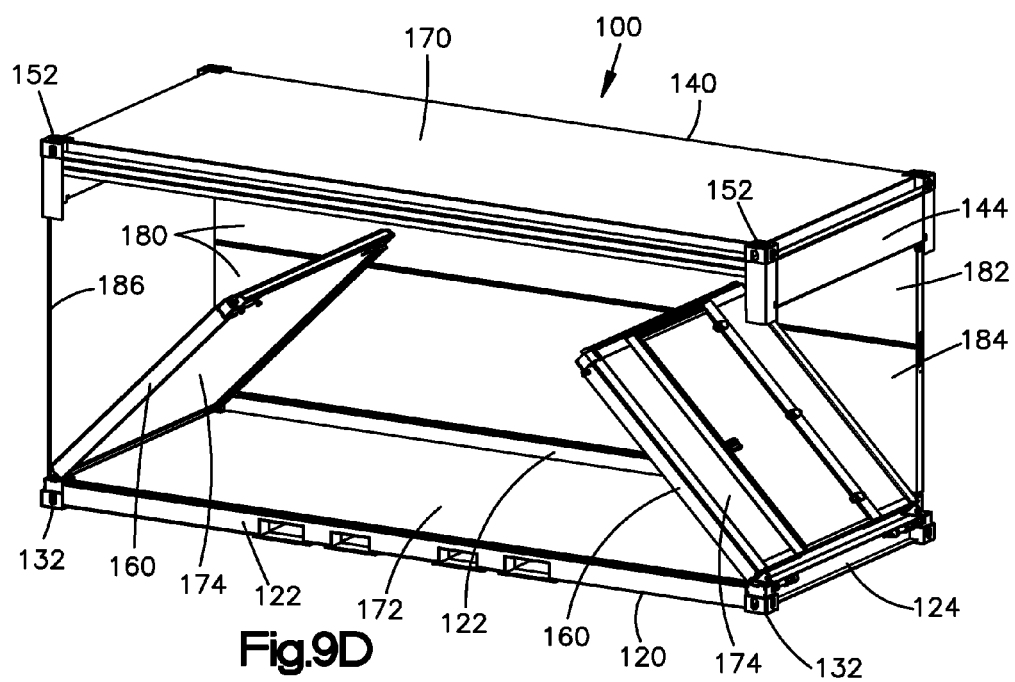
FIG. 9D is a perspective view of the collapsible container of FIG. 9A in a partially erected configuration, with the roof raised, the side wall unfolded, and the ends wall rotating from the lowered orientations to upright orientations.

When the roof 140 is raised to a height such that the side wall 180 is fully unfolded, as illustrated in FIG. 9C, the end walls 160 may be operated from the lowered orientations to the upright orientations, as illustrated in FIG. 9D. With the end walls 160 in the upright orientation and the stubs 164 of the posts 162 at least partially received in the sleeves 154, as illustrated in FIG. 9E, the roof 140 may be secured to the end walls 160, as described herein. The cable 186 may then be disconnected and may be stored, for example wound and attached to the sill 124. FIG. 9F illustrates the collapsible container 100, having a single side wall 180 attached to the second side 108, in a partially collapsed configuration. It should be appreciated that the side wall 180 need not be attached to the second side 108. For example, the side wall 180 could alternatively be attached to the first side 106. It should further be appreciated that the collapsible container 100 is not limited to a single side wall 180. For example, the collapsible container 100 may be configured with a first side wall 180 attached to the first side 106 and a second side wall 180 attached to the second side 108, as depicted in FIG. 10. It should further still be appreciated that the collapsible container 100 may be configured with no side walls 180, for example as illustrated in FIGS. 2A-2C.

Figure 11A:
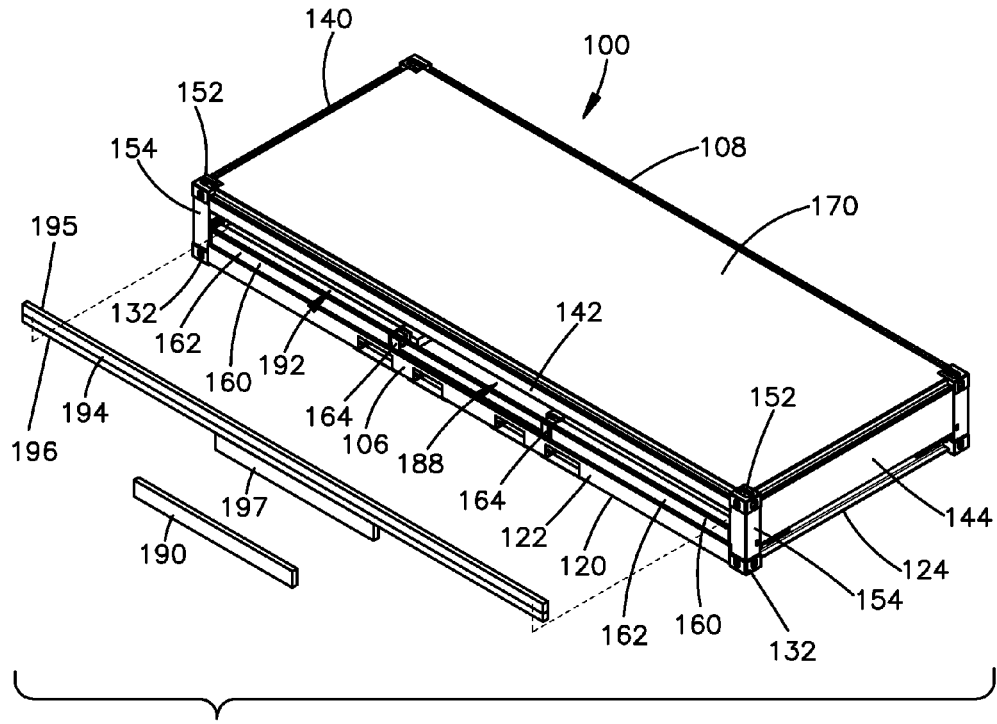
FIG. 11A is a perspective view of the collapsible container illustrated in FIG. 1 in the collapsed configuration, and of first and second plugs that may be disposed into cavities defined by the collapsible container.
Figure 11B:
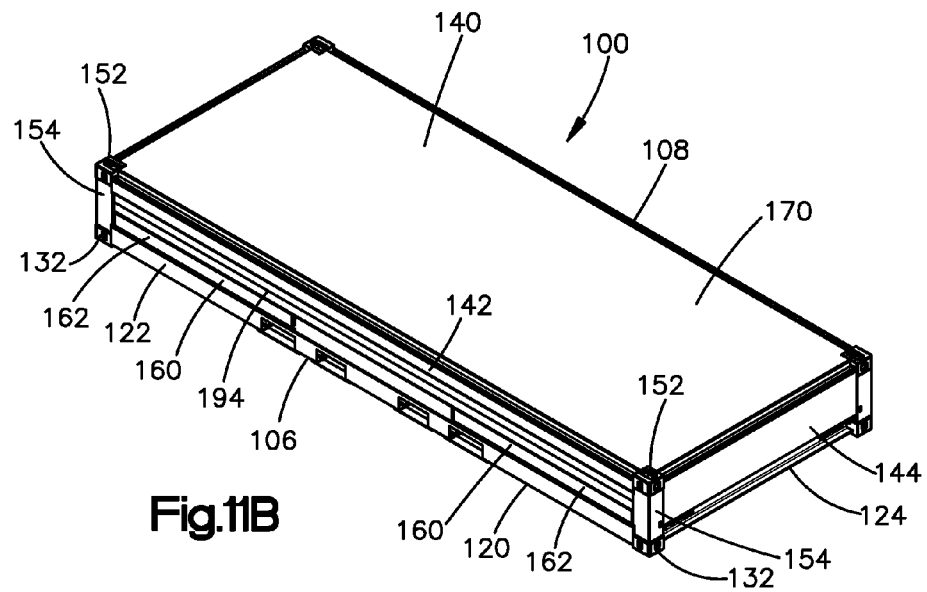
FIG. 11B is a perspective view of the collapsible container illustrated in FIG. 11A, with the first and second plugs disposed in the cavities.

Referring now to FIGS. 11A and 11B, the collapsible container 100 may define one or more cavities that may extend into the first and/or second sides 106,108 of the container 100, such as a cavity 188 and/or a cavity 192, for example. The container 100 may define the one or more cavities when in the collapsed configuration, for example. The one or more cavities may be open to the exterior of the container 100 (e.g., open to the first and/or second sides 106, 108), and thus may be accessible. The container 100 may include one or more seals (e.g., one or more plugs 190 and/or 194) that may be disposed into respective ones of the one or more cavities so as to at least partially seal the one or more cavities. FIG. 11B illustrates an example where a plug 194 is at least partially filling a first cavity 188 and a second cavity 192. The one or more plugs, for example the plug 190 and the plug 194, may be configured to be securable in the one or more cavities. For example, each plug may include a body that may be made of a compressible material, for example a resilient, compressible foam. The body of each plug may be wrapped in an outer coating material, for example a weather-resistant vinyl. Each plug may be configured to be compressed between respective components of the container 100, for example to compressibly secure the plug in position in a respective cavity.

When the container 100 includes a pair of end walls 160 and no side walls 180, for example as depicted in FIG. 2C, the container 100 may define two cavities 188, including a first cavity 188 that extends into the first side 106 of the container 100 and a second cavity 188 that extends into the second side 108 of the container 100. The first and second cavities 188 may be bounded by one or more components of the container 100. For example, each cavity 188 may have opposed side boundaries defined by the stubs 164 of the posts 162, a lower boundary defined by a respective base rail 122, and an upper boundary defined by a respective roof rail 142.

When the container 100 includes a single side wall 180, for example a side wall 180 attached to the second side 108 of the container 100 as depicted in FIG. 11A, and is in the collapsed configuration, the container 100 may define one cavity 188 that extends into the first side 106 of the container 100 and that may have an open upper boundary (e.g., defined by the width W1 of the posts 162). When the container 100 includes two side walls 180, for example as depicted in FIG. 10, the container 100 may not define any cavities 188. For example the posts 162 of the end walls 160 may be at least partially enclosed by the base rails 122.

A plug 190 may be used in association with the collapsible container 100. The plug 190 may be configured to at least partially fill the cavity 188. The plug 190 may be dimensioned to allow the plug 190 to be secured in the cavity 188. The plug 190 may be oversized with respect to one or more bounds of the cavity 188, for example horizontally opposed bounds of the cavity 188 (e.g., as defined by the stubs 164 of the posts 162) and/or vertically opposed bounds of the cavity 188 (e.g., as defined between the base rails 122 and roof rails 142 or by the width W1 of the posts 162). The plug 190 may be placed into the cavity 188 and compressibly secured in position in the cavity 188, for example as the container 100 is operated from the erected configuration to the collapsed configuration. For example, the plug 190 may be horizontally compressed (e.g., between the stubs 164 of the posts 162) and/or may be vertically compressed (e.g., between the base rails 122 and the roof rails 142).

When the container 100 includes a pair of end walls 160 and no side walls 180, for example as depicted in FIG. 2C, the container 100 may include a first plug 190 configured to be disposed in the cavity 188 that extends into the first side 106 of the container 100 and a second plug 190 configured to be disposed in the cavity 188 that extends into the second side 108 of the container 100. The collapsible container 100, the first plug 190, and the second plug 190 may define a system (e.g., a collapsible container system).

The container 100 may define a cavity 192 that may extend into the first side 106 of the container 100. For example, when the collapsible container 100 includes a single side wall 180 (e.g., a side wall 180 attached to the second side 108 of the container 100) and is in the collapsed configuration, for example as illustrated in FIG. 11A, the container 100 may define a first cavity 188 (e.g., extending into the first side 106 of the container 100) and a second cavity 192 that may extend into the first side 106 of the container 100. The cavity 192 may be bounded by one or more components of the container 100. For example, the cavity 192 may have opposed side boundaries defined by the sleeves 154 of the corner assemblies 150, a lower boundary defined by the posts 162 of the end walls 160, and an upper boundary defined by a respective roof rail 142. The cavity 192 may be at least partially open to the cavity 188, for example along a portion of the lower boundary between the stubs 164 of the posts 162.

A plug 194 may be used in association with the collapsible container 100. The plug 194 may be configured to at least partially fill the first and second cavities 188, 192. The plug 194 may include a first or upper portion 195, a second or middle portion 196, and a third or lower portion 197. The upper portion 195 may be hinged with respect to the middle portion 196 along a first side of the plug 194 and the middle portion 196 may be hinged with respect to the lower portion 197 along an opposed second side of the plug 194. The upper and middle portions 195, 196 of the plug 194 may be dimensioned to allow the upper and middle portions 195, 196 to be secured in the second cavity 192. The lower portion 197 of the plug 194 may be dimensioned to allow the lower portion 197 of the plug 194 to be secured in the first cavity 188. For example, the lower portion 197 of the plug 194 may be dimensioned similarly to the plug 190.

The plug 194 may be oversized with respect to one or more bounds of the first and second cavities 188, 192, for example vertically opposed bounds of the cavity 192 (e.g., as defined by the posts 162 of the end walls 160, the base rails 122, and the roof rails 142). The plug 194 may be placed into the first and second cavities 188, 192 and compressibly secured in position in the first and second cavities 188, 192, for example as the container 100 is operated from the erected configuration to the collapsed configuration. For example, a central section of the upper and middle portions 195, 196 of the plug 194 may be vertically compressed between the roof rails 142 and the base rails 122, and outer sections of the upper and middle portions 195, 196 of the plug 194 that flank the central section may be vertically compressed between the posts 162 of the end walls 160 and the roof rails 142, for example as illustrated in FIG. 11B. The collapsible container 100 and the plug 194 may define a system (e.g., a collapsible container system).

The plugs described herein (e.g., the plugs 190 and 194) may be configured to decompress to substantially their original shapes when removed from the cavities 188, 192. One or more of the plugs may be reused. For example, when the collapsible container 100 is operated from the collapsed configuration to the erected configuration, one or more plugs 190 may be retained and reused when the container 100 is subsequently operated to collapsed configuration (e.g., if the container 100 is operated to the collapsed configuration for shipment). A plug 194 may be attached to the container 100 and may be repurposed as a seal when the container is in the erected configuration.

Referring now to FIGS. 12A-12F, one or more collapsible containers 100 may be combined, for example configured as a shelter 400. Although a combination of collapsible containers 100 may be illustratively referred to as the shelter 400 herein, a combination of containers 100 is not limited to use as a shelter and may serve other purposes.

Figure 12A:
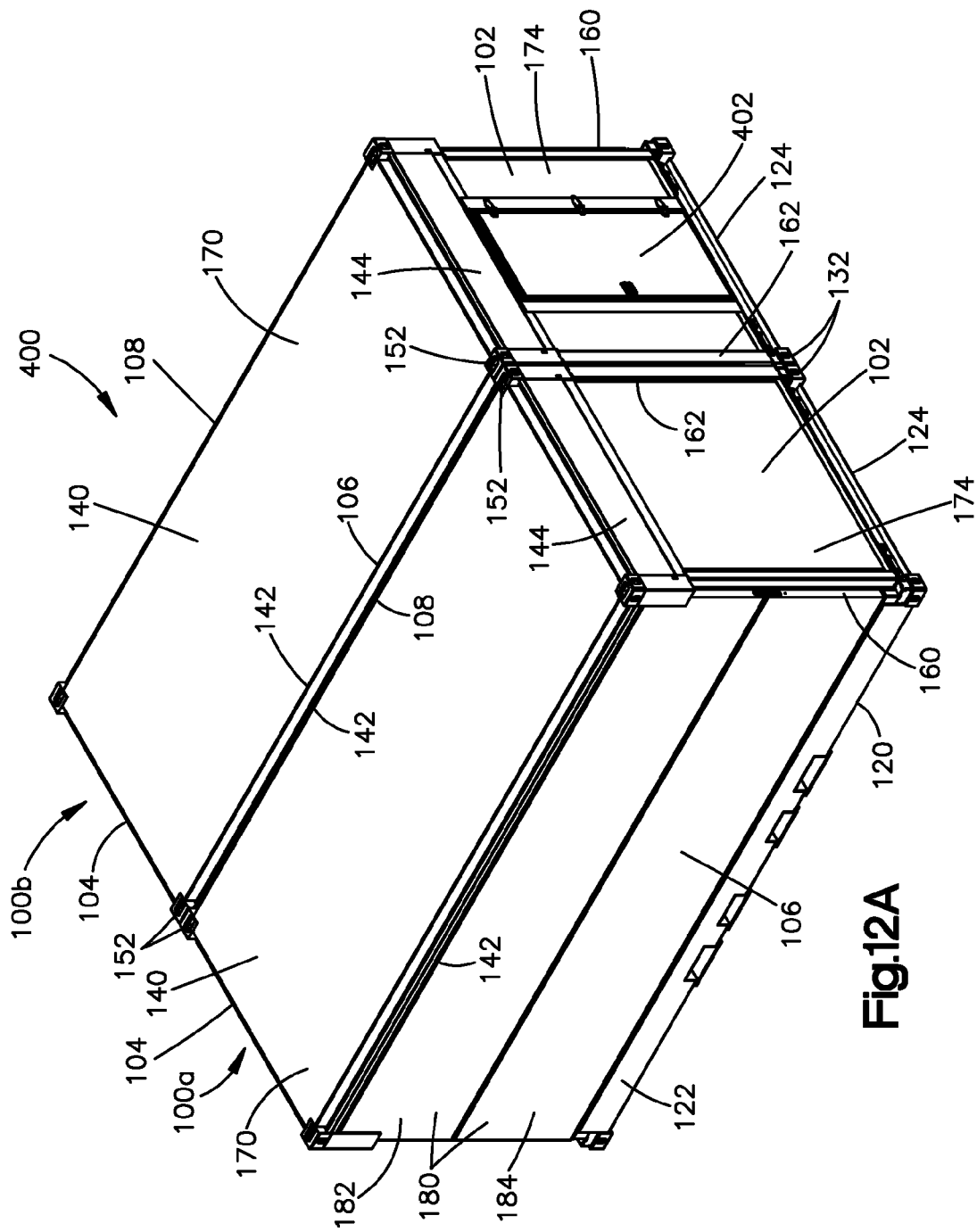
FIG. 12A is a perspective view of a shelter than can be constructed by connecting two of the collapsible containers illustrated in FIG. 1 to each other.
Figure 12B:
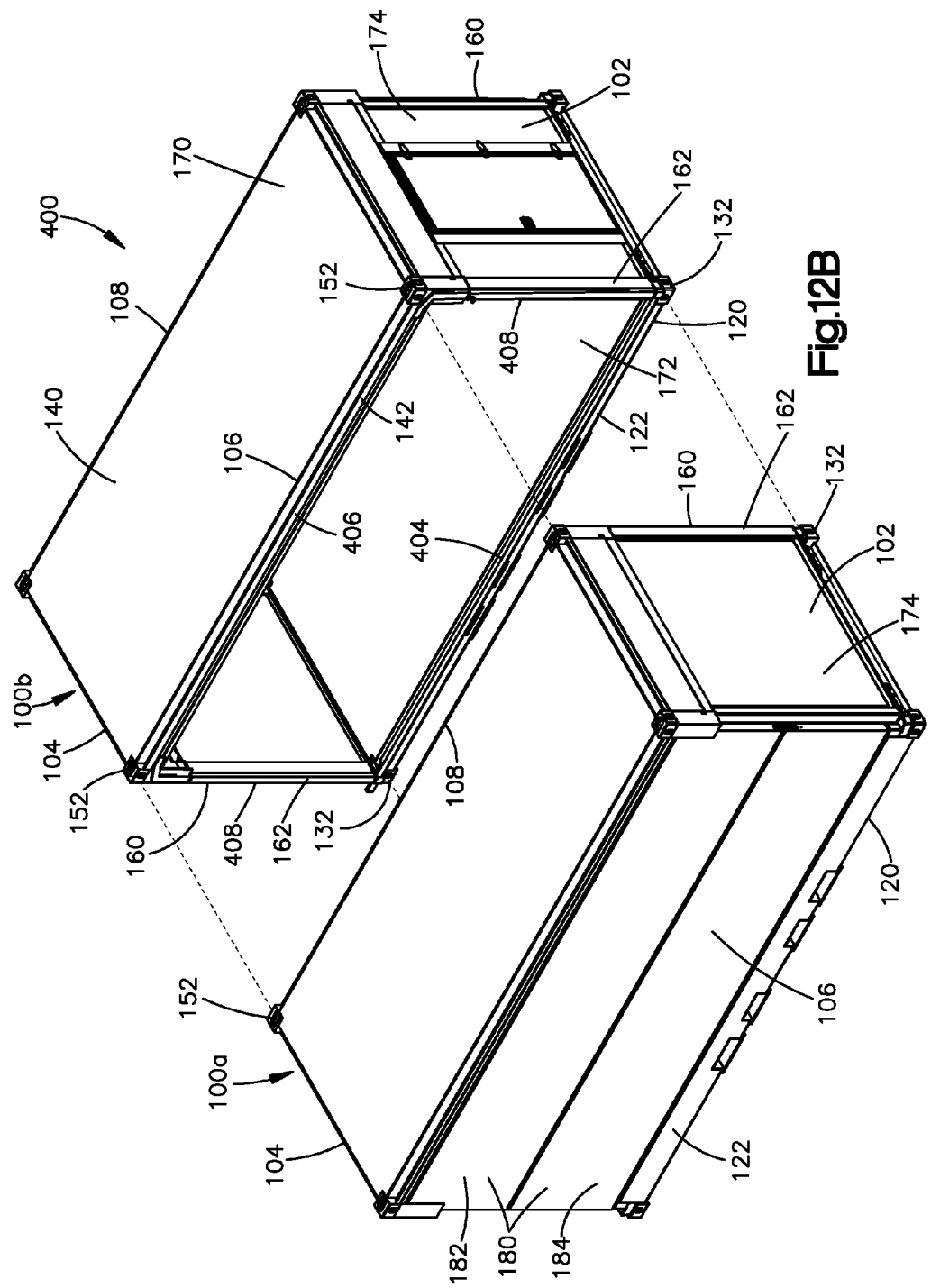
FIG. 12B is a perspective view of the collapsible containers illustrated in FIG. 12A, before the containers are connected to each other.
Figure 12E:
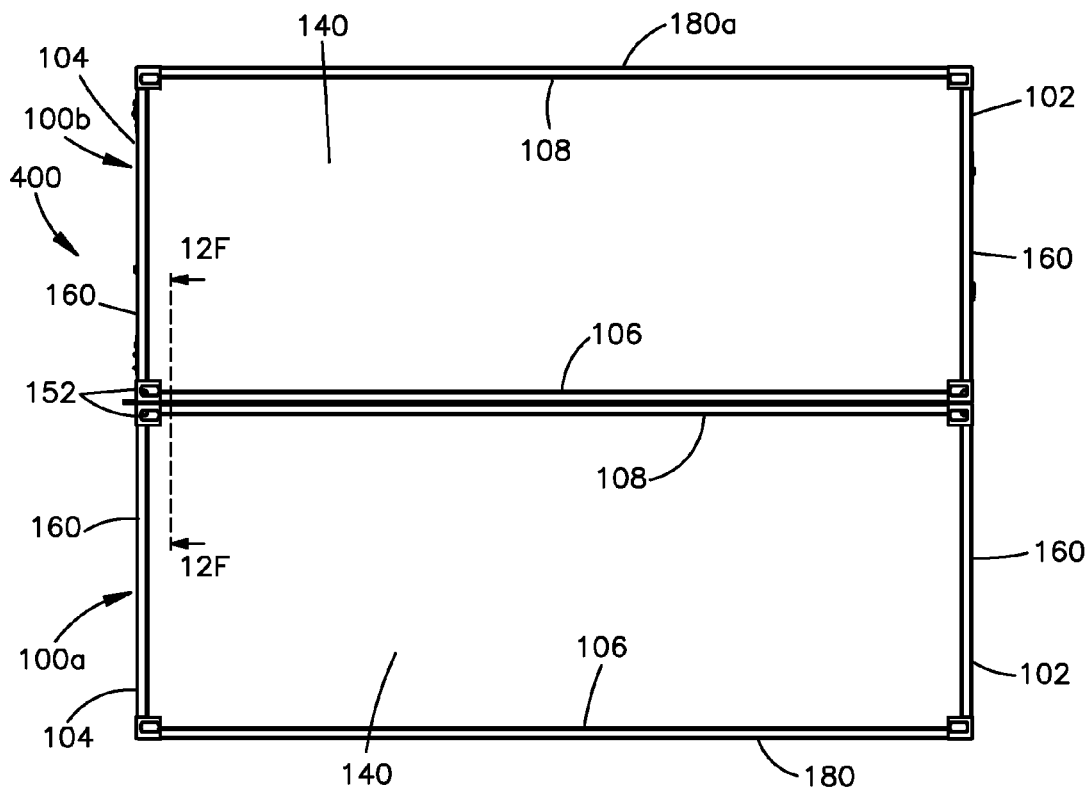
FIG. 12E is an overhead plan view of the shelter illustrated in FIG. 12A.
Figure 12F:
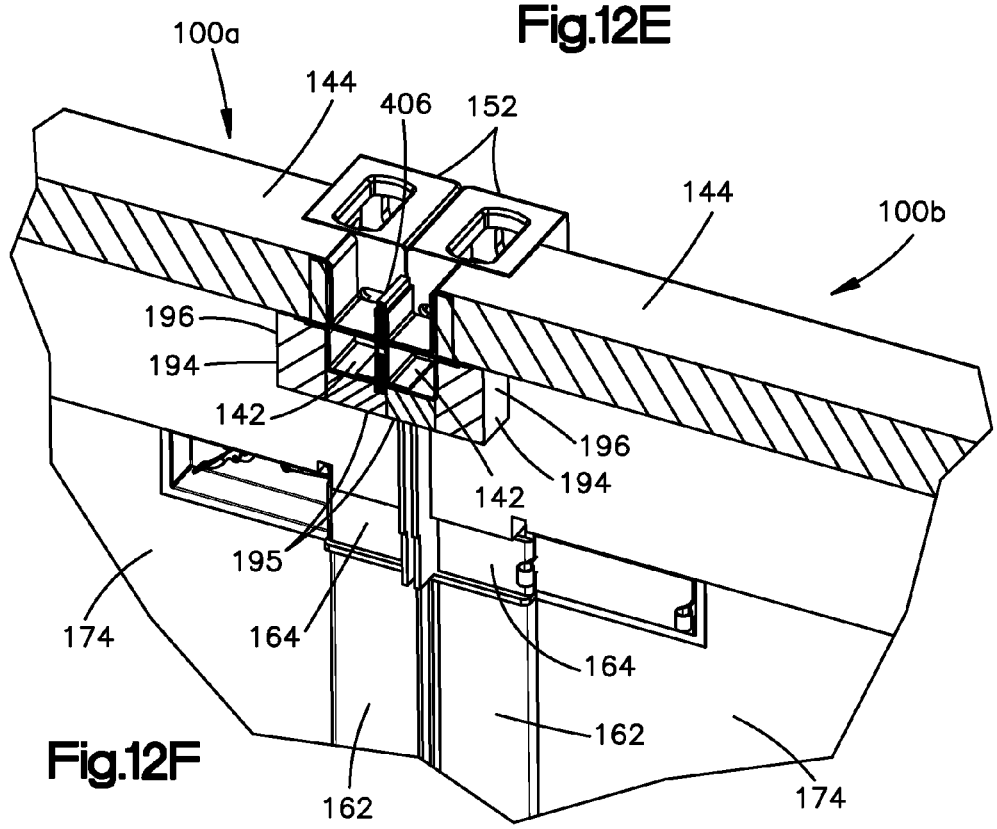
FIG. 12F is a sectional perspective view of a portion of the shelter illustrated in FIG. 12A.

As illustrated in FIG. 12A, a first collapsible container 100a and a second collapsible container 100b may be disposed adjacent to each other (e.g., abutted) and may be connected (e.g., attached) to each other to define the shelter 400. The first container 100a may include a roof panel 170, a floor panel 172, two end wall panels 174, and a side wall 180 attached to the first side 106 of the first container 100a. The second side 108 of the first container 100a may be open to the second container 100b. The second container 100b may include a roof panel 170, a floor panel 172, two end wall panels 174, and a side wall 180 attached to the second side 108 of the second container 100b. The first side 106 of the second container 100b may be open to the first container 100a. When the first and second containers 100a, 100b are connected to each other to define the shelter 400, the shelter 400 may define an enclosed interior volume approximately equal to a combination of the respective volumes of the first and second containers 100a, 100b. The first and second containers 100a, 100b may be secured to each other, for example at corresponding corner castings 132 and/or 152.

The shelter 400 may define one or more openings to the exterior of the shelter 400, for example to allow ingress and/or egress to the shelter 400. For example, the first end 102 of the second container 100b may include a door 402 supported by the end wall panel 174 of the end wall 160. It should be appreciated that the shelter 400 is not limited to the illustrated door 402 or the placement thereof, and that any suitable number of openings, such as doors, windows, and the like, may be supported by one or more panels of one or both of the first and second containers 100a, 100b. It should further be appreciated that the construction of a shelter using the collapsible container 100 is not limited to the illustrated shelter 400. For example, two collapsible containers 100 may be configured to be connected end-to-end. Alternatively, two containers 100 may be configured to be stacked one on top of the other and connected to each other, for example omitting the floor panel 172 from the upper container 100 and the roof panel 170 from the lower container 100. Moreover, more than two containers 100 may be used to construct a shelter, for example using any combination of the above-described connections or otherwise.

With reference now to FIGS. 12B-12F, when one or more collapsible containers 100 are combined (e.g., into the shelter 400), one or more seams (e.g., gaps, openings, etc.) may be defined between adjacent containers 100. For example, when the first and second containers 100a, 100b of the shelter 400 are attached to each other, a first seam may be defined between the roof rail 142 at the second side 108 of the first container 100a and the roof rail 142 at the first side 106 of the second container 100b. A second seam may be defined between the base rail 122 at the second side 108 of the first container 100a and the base rail 122 at the first side 106 of the second container 100b. A third seam may be defined between corresponding posts 162 at the first ends 102 of the first and second containers 100a, 100b. A fourth seam may be defined between corresponding posts 162 at the second ends 104 of the first and second containers 100a, 100b. One or more of the first, second, third, and fourth seams may allow undesirable ingress of water, air, sand, etc. into the interior of the shelter 400.

One or more seals (e.g., gaskets) may be used in association with the shelter 400 (e.g., with the first and/or second containers 100a, 100b). The one or more gaskets may be configured to create a seal between the first and second containers 100a, 100b. For example, the shelter 400 may include one or more of a floor gasket 404, a roof gasket 406, and a pair of end gaskets 408. One or more of these gaskets (e.g., each gasket) may be configured to be magnetically attached to one or both of the first and second containers 100a, 100b and may be configured to be compressible such that each gasket may be compressed between respective components of the first and second containers 100a, 100b. For example, each gasket may define a body made of a compressible material (e.g., closed-cell type ethylene propylene diene monomer (EPDM) rubber). The body of each gasket may include at least one magnet (e.g., a rare earth magnet), for example embedded in the body, such that the gasket may be magnetically attached to the first and/or second containers 100a, 100b. For example, each gasket may have a plurality of rare earth magnets embedded within the body of the gasket. The plurality of magnets may be spaced apart from each other within the body.

One or more of the gaskets may be configured to be compressed when the first and second containers 100a, 100b are connected to each other. For example, each end gasket 408 may define a first width (e.g., measured along a direction that extends substantially perpendicular to corresponding posts 162 of the first and second containers 100a, 100b) when the end gasket 408 is attached to one of the first and second containers 100a, 100b (e.g., the second container 100b). When the first container 100a is then moved into position relative to the second container 100b and connected to the second container 100b, the end gaskets 408 may be compressed between the corresponding posts 162 of the end walls 160 of the first and second containers 100a, 100b to a second width that is narrower than the first width, thereby creating a seal (e.g., a substantially airtight seal) between the end walls 160 of the first and second containers 100a, 100b. The floor gasket 404 may also be configured to be compressed between the base rails 122 of the first and second containers 100a, 100b when the first and second containers 100a, 100b are connected to each other. The roof gasket 406 may also be configured to be compressed between the roof rails 142 and/or the side gutters 146 of the first and second containers 100a, 100b when the first and second containers 100a, 100b are connected to each other.

One or more of the gaskets (e.g., the floor gasket 404, the roof gasket 406, and the end gaskets 408) may be reused, for example if the shelter 400 is broken down and subsequently redeployed. The gaskets described herein (e.g., the floor gasket 404, the roof gasket 406, and the end gasket 408) may be configured to decompress to substantially their original shapes when removed from the first and/or second containers 100a, 100b. One or more of the gaskets may be reused. For example, when the shelter 400 is broken down, the gaskets may be retained for use when the first and second containers 100a, 100b are subsequently recombined (e.g., into the shelter 400).

Referring now to FIGS. 12F, 13A-13C, 14A-14C, and 15A-15C, at least a portion of an interior of the shelter 400 (e.g., the interior roof of the shelter 400) may be further sealed (e.g., in addition to use of the roof gasket 406). The plug 194 may be configured for use other than to at least partially seal the first and second cavities 188, 192. Each plug 194 may be configured to at least partially create a seal along an interior of the roof of the shelter 400, for example along the first seam between the first and second containers 100a, 100b.

Figure 13A:
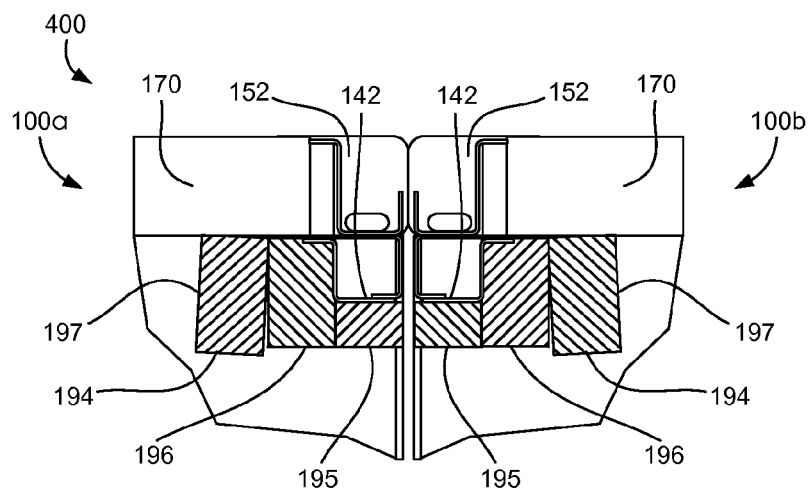
FIGS. 13A-13C depict end section views of plugs configured to at least partially fill cavities defined by two collapsible containers.
Figure 13B:
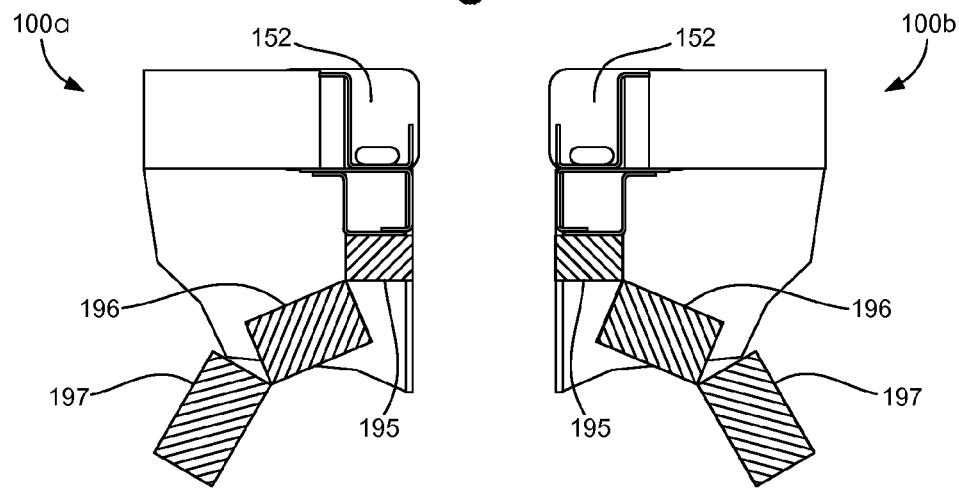
Figure 13C:
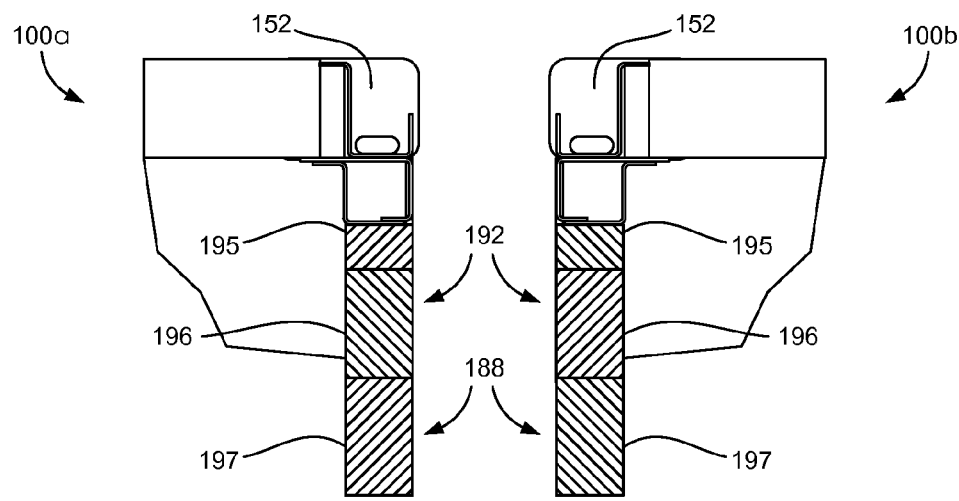

FIGS. 13A-13C illustrate operation of respective plugs 194 attached to the first and second containers 100a, 100b of the shelter 400. The upper portion 195 of each plug may be attached (e.g., semi-permanently bonded) to a corresponding roof rail 142. For example, the upper portion 195 of a first plug 194 may be attached to the roof rail 142 at the second side 108 of the first container 100a and the upper portion 195 of a second plug 194 may be attached to the roof rail 142 at the first side 106 of the second container 100b.

When the shelter 400 is erected, the middle and lower portions 196, 197 may be rotated about their respective hinged sides and stored along the roof of the shelter 400. The lower portion 197 of each plug 194 may be secured (e.g., temporarily) to the roof of the respective first or second container 100a, 100b (e.g., as illustrated in FIG. 13A), for example using complementary hook and loop fasteners attached to the roof panels 170 of the first and second containers 100a, 100b and to the lower portions 197 of the plugs 194.

The lower portion 197 of each plug 194 may support a flap (not shown) that includes hook fasteners along an upper surface and loop fasteners along an opposed lower surface. The flaps may be made, for example, of the outer coating material of the plug 194, for example a weather-resistant vinyl. The flaps of the plugs 194 may be configured to at least partially overlap one another and to releasably attach to each other (e.g., using the hook and loop fasteners) to create a seal along the first seam between the first and second containers 100a, 100b. Alternatively, a "T-shaped" trim strip (not shown) may be inserted between the upper portions 195 of the plugs 194 to create the seal along the first seam between the first and second containers 100a, 100b.

When the shelter 400 is broken down, the lower portions 197 of the plugs 194 may be released from the roofs of the first and second containers 100a, 100b, and the middle and lower portions 196, 197 may be rotated about their respective hinged sides, for example as illustrated in FIGS. 13B and 13C. As the first and second containers 100a, 100b are operated from the erected configurations to the collapsed configurations, the upper and middle portions 195, 196 of each plug 194 may be compressed in a respective cavity 192 and the lower portion 197 of each plug 194 may be compressed in a respective cavity 188.

Figure 14A:
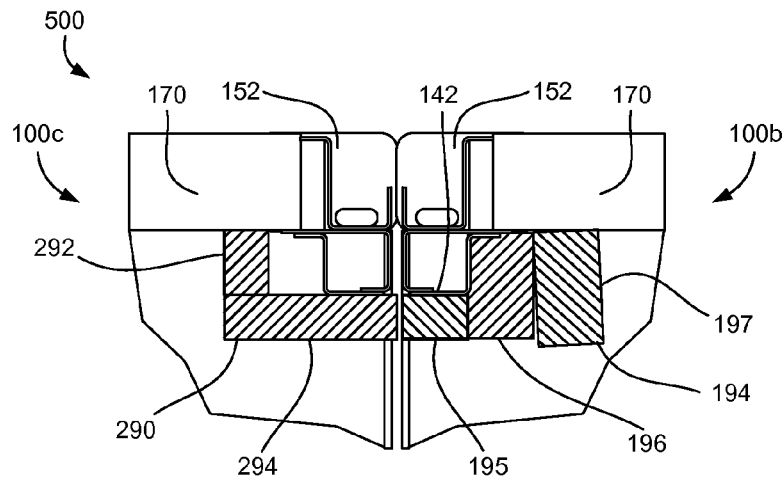
FIGS. 14A-14C depict end section views of plugs and a butting gasket configured to at least partially fill cavities defined by two collapsible containers.
Figure 14B:
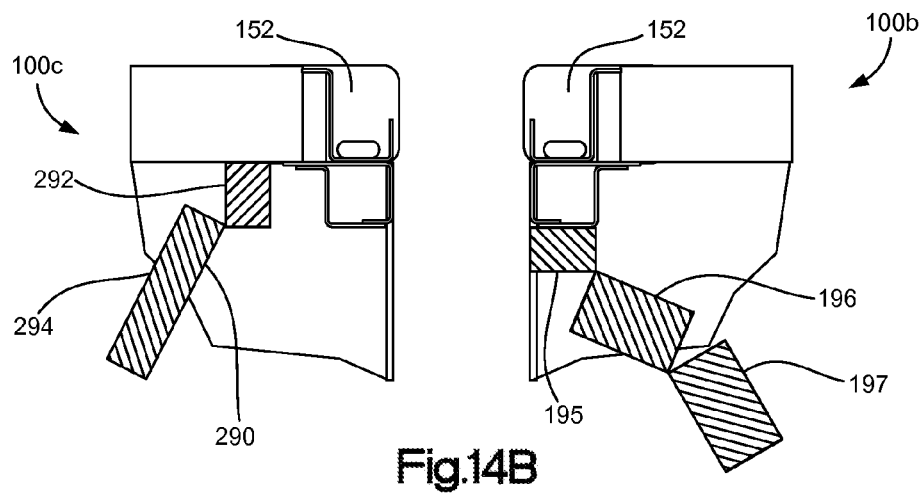
Figure 14C:
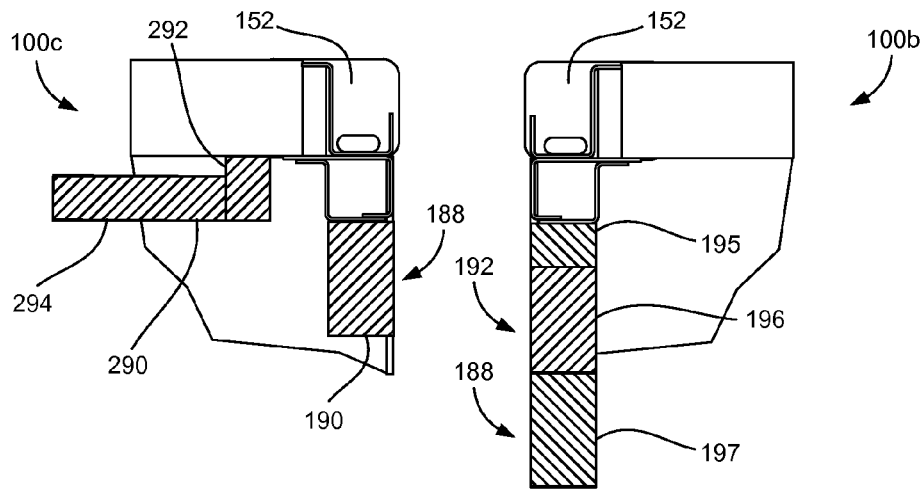

FIGS. 14A-14C illustrate the sealing of a first seam along the roof of a shelter 500 that includes a first container 100c configured for example, like the container 100 illustrated in FIGS. 2A-2C and a second container 100b. The first container 100c may include a butting gasket 290. The butting gasket 290 may include a first or upper portion 292 and a second or lower portion 294. The upper portion 292 may be hinged with respect to the lower portion 294 along a first side of the butting gasket 290. The upper portion 292 of the butting gasket 290 may be attached (e.g., semi-permanently bonded) to an inner surface of the roof panel 170 of the first container 100c. The second container 100b may include a plug 194. The upper portion 195 of the 195 of the plug 194 may be attached (e.g., semi-permanently bonded) to the roof rail 142 at the first side 106 of the second container 100b.

As shown in FIG. 14A, when the shelter 500 is erected, the lower portion 294 of the butting gasket 290 may be rotated about the hinged side and secured (e.g., temporarily) to the roof rail 142 of the first container 100c, for example using complementary hook and loop fasteners attached to the roof rail 142 and to the lower portion 294. The middle and lower portions 196, 197 of the plug 194 may be rotated about their respective hinged sides and stored along the roof 140 of the second container 100b. The lower portion 197 of the plug 194 may be secured (e.g., temporarily) to the roof 140 of the second container 100b, for example using complementary hook and loop fasteners attached to the roof panel 170 of the first second container 100b and to the lower portion 197 of the plug 194.

The lower portion 294 of the butting gasket 290 and the lower portion 197 of the plug 194 may each support a flap (not shown) that includes hook fasteners along an upper surface and loop fasteners along an opposed lower surface. The flaps may be made, for example, of the outer coating material of the plug 194, for example a weather-resistant vinyl. The flaps may be configured to at least partially overlap one another and to releasably attach to each other (e.g., using the hook and loop fasteners) to create a seal along the first seam between the first and second containers 100c, 100b. Alternatively, a "T-shaped" trim strip (not shown) may be inserted between the lower portion 294 of the butting gasket 290 and the upper portion 195 of the plug 194 to create the seal along the first seam between the first and second containers 100c, 100b.

When the shelter 500 is broken down, the lower portion 294 of the butting gasket 290 may be released from the roof rail 142 of the first container 100c and may be rotated about its hinged sides, for example as illustrated in FIG. 14B. The lower portion 294 may be secured to the upper portion 292, as illustrated in FIG. 14C, for example using complementary hook and loop fasteners attached to corresponding sections of the upper and lower portions 292, 294. As the first container 100c is operated from the erected configuration to the collapsed configuration, a plug 190 may be compressed into each of the cavities 188 defined by the first container 100c.

The lower portion 197 of the plug 194 may be released from the roof 140 of the second container 100b and the middle and lower portions 196, 197 may be rotated about their respective hinged sides, for example as illustrated in FIGS. 14B and 14C. As the second container 100b is operated from the erected configurations to the collapsed configuration, the upper and middle portions 195, 196 of the plug 194 may be compressed in the cavity 192 defined by the second container 100b and the lower portion 197 of the plug 194 may be compressed in the cavity 188 defined by the second container 100b.

Figure 15A:
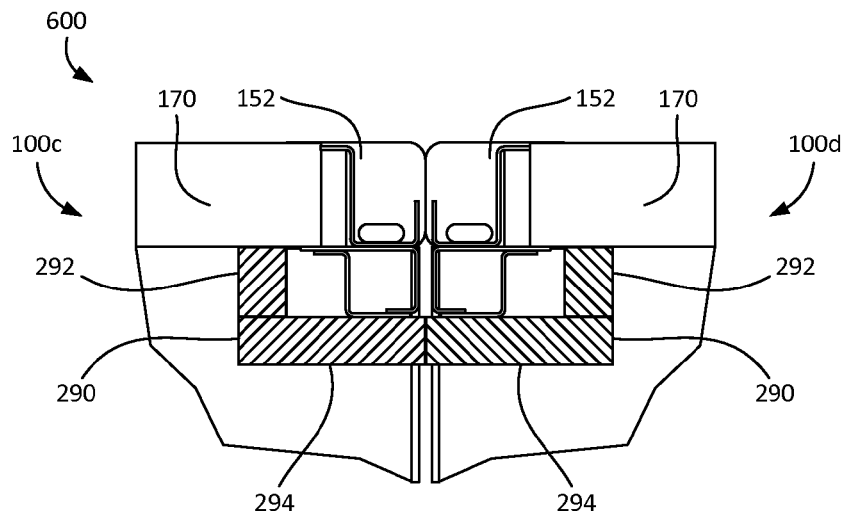
FIGS. 15A-15C depict end section views of plugs and butting gaskets configured to at least partially fill cavities defined by two collapsible containers.
Figure 15B:
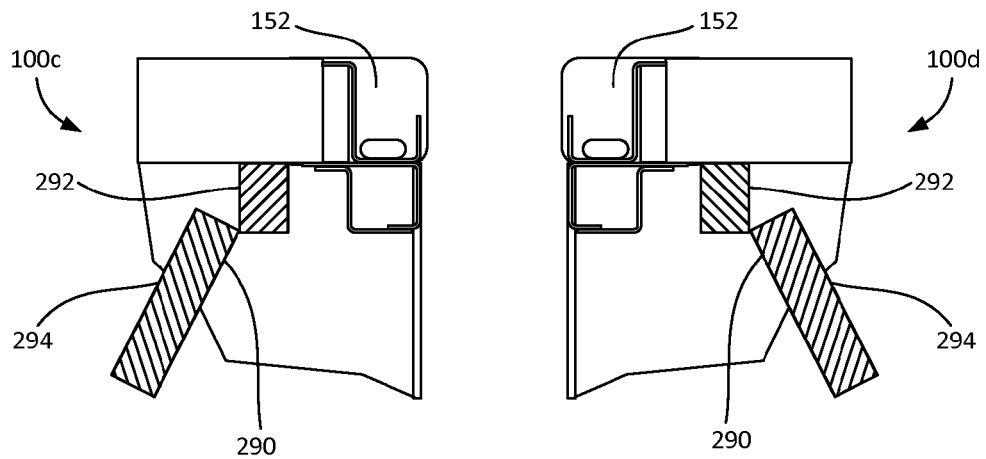
Figure 15C:
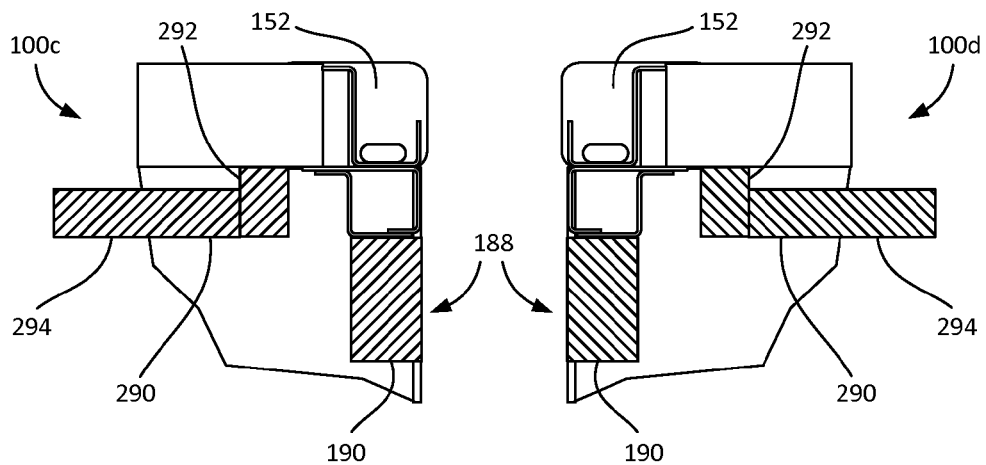

FIGS. 15A-15C illustrate the sealing of a first seam along the roof of a shelter 600 that includes first and second containers 100c,100d configured for example, like the container 100 illustrated in FIGS. 2A-2C. The first and second containers 100c, 100d may include butting gaskets 290. The upper portions 292 of the butting gaskets 290 may be attached (e.g., semi-permanently bonded) to respective inner surfaces of the roof panels 170 of the first and second containers 100c, 100d.

As shown in FIG. 15A, when the shelter 600 is erected, the lower portions 294 of the butting gaskets 290 may be rotated about the respective hinged sides and secured (e.g., temporarily) to the respective roof rails 142 of the first and second containers 100c, 100d, for example using complementary hook and loop fasteners attached to the roof rails 142 and to the lower portions 294.

The lower portions 294 of the butting gaskets 290 may each support a flap (not shown) that includes hook fasteners along an upper surface and loop fasteners along an opposed lower surface. The flaps may be made, for example, of the outer coating material of the plug 194, for example a weather-resistant vinyl. The flaps may be configured to at least partially overlap one another and to releasably attach to each other (e.g., using the hook and loop fasteners) to create a seal along the first seam between the first and second containers 100c, 100d. Alternatively, a "T-shaped" trim strip (not shown) may be inserted between the lower portions 294 of the butting gaskets 290 to create the seal along the first seam between the first and second containers 100c, 100d.

When the shelter 600 is broken down, the lower portions 294 of the butting gaskets 290 may be released from the roof rails 142 of the first and second containers 100c, 100d and may be rotated about the respective hinged sides, for example as illustrated in FIG. 15B. The lower portions 294 may be secured to the upper portions 292, as illustrated in FIG. 15C, for example using complementary hook and loop fasteners attached to corresponding sections of the upper and lower portions 292, 294. As the first and second containers 100c, 100d are operated from the erected configuration to the collapsed configuration, plugs 190 may be compressed into the respective cavities 188 defined by the first and second containers 100c, 100d.

What is claimed:

1. A collapsible container system comprising:
   a first collapsible container that includes a first base, a first roof, and a first pair of end walls;
   a second collapsible container that includes a second base, a second roof, and a second pair of end walls; and
   a reusable gasket comprising:
      a compressible body that is configured to create a seal along at least a portion of a seam defined between the first and second collapsible containers when the first and second collapsible containers are combined to form a shelter; and
      at least one magnet embedded in the body.

2. The collapsible container system of claim 1, wherein the body is made of ethylene propylene diene monomer (EPDM) rubber.

3. The collapsible container system of claim 1, wherein the gasket further comprises a plurality of magnets embedded in the body.

4. The collapsible container system of claim 3, wherein the plurality of magnets are spaced apart from each other within the body.

5. The collapsible container system of claim 3, wherein at least one of the plurality of magnets is a rare earth magnet.

6. The collapsible container system of claim 1, wherein the gasket further comprises a plurality of magnets embedded in the body, the plurality of magnets spaced apart from each other within the body.

7. The collapsible container system of claim 6, wherein the gasket is configured to be compressed between a first end wall post of the first collapsible container and a corresponding second end wall post of the second collapsible container.

8. The collapsible container system of claim 6, wherein the gasket is configured to be compressed between a first rail of the first collapsible container and a corresponding second rail of the second collapsible container.

9. The collapsible container system of claim 8, wherein the first and second rails are at least one of roof rails or base rails.

10. The collapsible container system of claim 1, wherein the body compresses in the seam when the first collapsible container is attached to the second collapsible container, thereby creating the seal between the first and second collapsible containers.

11. The collapsible container system of claim 10, wherein the body decompresses to an original shape of the body when the gasket is removed from the seam.

12. The collapsible container system of claim 1, wherein the body extends from first corresponding corners of the first and second collapsible containers to second corresponding corners of the first and second collapsible containers.

\* \* \* \* \*